United States Patent [19]

Saini

[11] Patent Number: 5,036,482

[45] Date of Patent: Jul. 30, 1991

[54] METHOD AND CIRCUITRY FOR DIGITAL SYSTEM MULTIPLICATION

[75] Inventor: Avtar Saini, San Jose, Calif.

[73] Assignee: Intel Corporation, Santa Clara, Calif.

[21] Appl. No.: 335,125

[22] Filed: Apr. 7, 1989

[51] Int. Cl.⁵ .............................................. G06F 7/52
[52] U.S. Cl. .................................................. 364/760
[58] Field of Search .................... 364/754, 757–760

[56] References Cited

U.S. PATENT DOCUMENTS

| | | | |
|---|---|---|---|
| 3,508,038 | 4/1970 | Goldschmidt et al. | 364/757 |
| 4,173,789 | 11/1979 | Miura | 364/760 |
| 4,276,607 | 6/1981 | Wong | 364/760 |
| 4,644,491 | 2/1987 | Ookawa et al. | 364/754 |
| 4,799,183 | 1/1989 | Nakano et al. | 364/760 |
| 4,817,029 | 3/1989 | Finegold | 364/760 |
| 4,878,191 | 10/1989 | Oguchi | 364/759 |

OTHER PUBLICATIONS

MacSorley, "High-Speed Arithmetic in Binary Computers", *Proceedings of the IRE*, vol. 49, #1, pp. 67–91, Jan., 1961.

J. Cavanagh, *Digital Computer Arithmetic Design and Implementation*, pp. 137–235 (1984).

K. Hwang, *Computer Arithmetic Principles, Architecture, and Design*, pp. 84–103 and 129–160 (1979).

F. Hill and G. Peterson, *Digital Systems: Hardware Organization and Design*, pp. 16–18; 158–162; and 355–360 (1973).

J. Wakerly, *Microcomputer Architecture and Programming*, pp. 107–113 (1981).

S. Waser and M. Flynn, *Introduction to Arithmetic for Digital Systems Designers*, pp. 131–169 and 215–233 (1982).

U. Kulisch and W. Miranker, *Computer Arithmetic in Theory and Practice*, pp. 170–219 (1981).

T. Rhyne and N. Strader, II, *A Signed Bit-Sequential Multiplier*, IEEE Transactions on Computers, vol. C-35, No. 10, pp. 896–901 (Oct. 1986).

M. Hatamian and G. Cash, *A 70 MHz 8-Bit×8-Bit Parallel Pipelined Multiplier in 2.5 Um CMOS*, IEEE Journal of Solid State Circuits, vol. SC 21, No. 4, pp. 505–513 (Aug. 1986).

S. Kuninobu et al., *Design of High Speed MOS Multiplier and Divider Using Redundant Binary Representation*, IEEE CH2419-0/87/0000/0080, pp. 80–86 (1987).

B. Bose et al., *Fast Multiply and Divide for a VLSI Floating-Point Unit*, IEEE CH2419-0/87/0000/0087, pp. 87–94 (1987).

V. Peng et al., *On the Implementation of Shifters, Multipliers, and Dividers in VLSI Floating Point Units*, IEEE CH2419-0/87/0000/0095, pp. 95–102 (1987).

J. Kurawski and J. Gosling, *Design of a High-Speed Square Root Multiply and Divide Unit*, IEEE Transactions on Computers, vol. C-36, No. 1, pp. 13–23 (Jan. 1987).

S. Nakamura and K. Chu, *A Single Chip Parallel Multiplier by MOS Technology*, IEEE Transactions on Computers, vol. 37, No. 3, pp. 274–282 (Mar. 1988).

Vol. I (Microprocessor) of *Microprocessor and Peripheral Handbook of Intel Corp.*, pp. 4–1 through 4–165 (Oct. 1987).

*Primary Examiner*—Dale M. Shaw
*Attorney, Agent, or Firm*—Blakely, Sokoloff, Taylor & Zafman

[57] ABSTRACT

A method and circuitry for multiplication in a digital system is described. The circuitry includes a partial product generator, a carry-save adder, a sum latch, a carry latch, an adder, a latch, circuitry for truncating, and coupling circuitry. A method and circuitry for optimizing a speed of a subsequent multiplication in a digital system is described. Circuitry for optimizing multiplication clock cycles in a digital system is described.

14 Claims, 10 Drawing Sheets

FIG_1 (PRIOR ART)
```
      1 0 1 1    MULTIPLICAND
      1 1 0 1    MULTIPLIER
      -------
      1 0 1 1  ⎫
    0 0 0 0    ⎬  SHIFTED
  1 0 1 1      ⎪  PARTIAL PRODUCTS
1 0 1 1        ⎭
---------------
1 0 0 0 1 1 1 1  PRODUCT
```
FIG_2 (PRIOR ART)
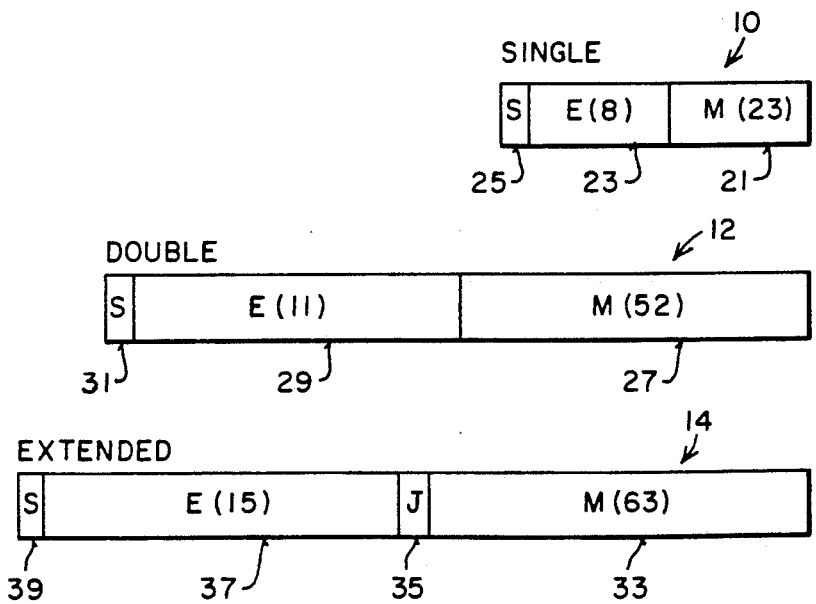

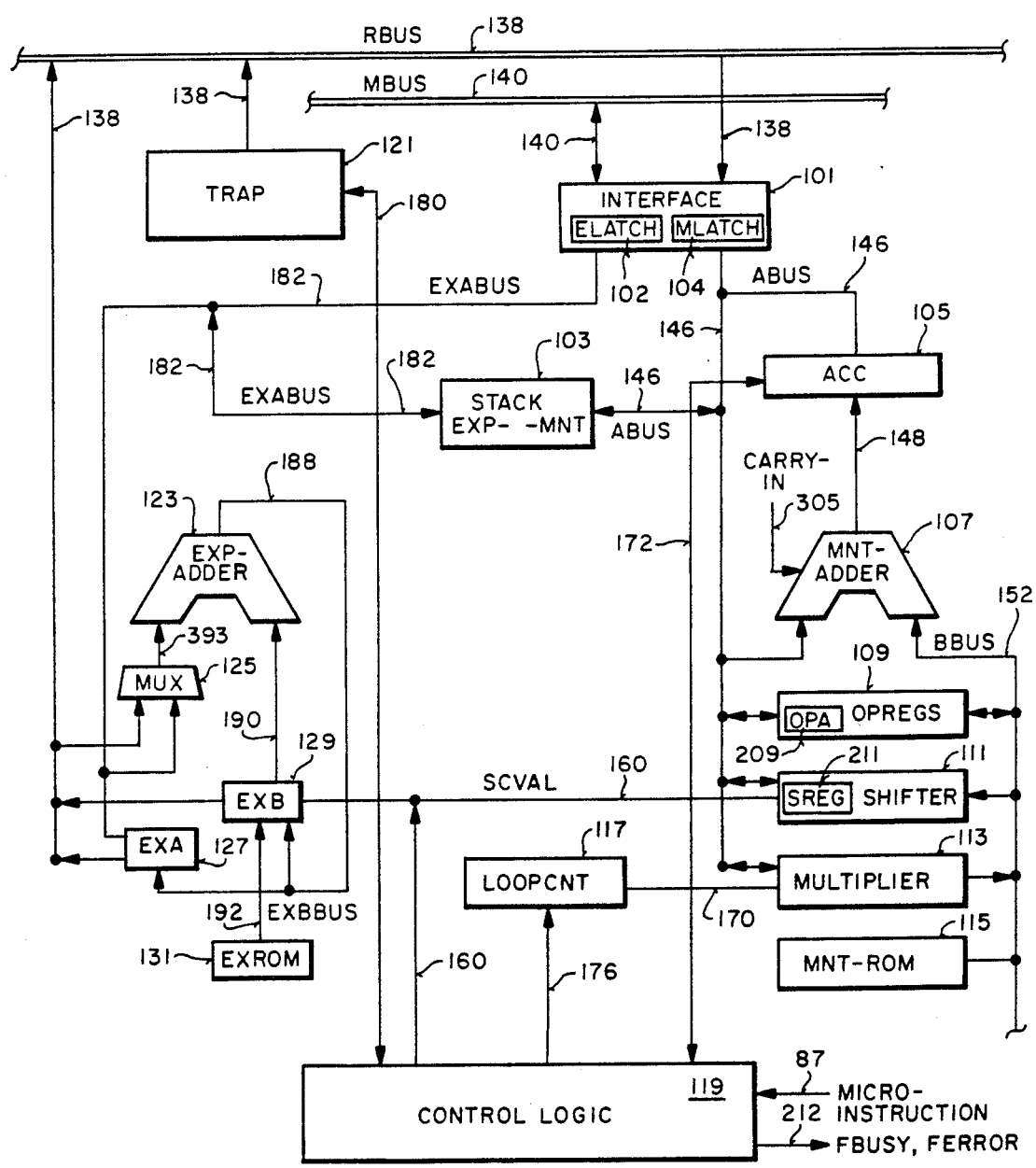
FIG_3

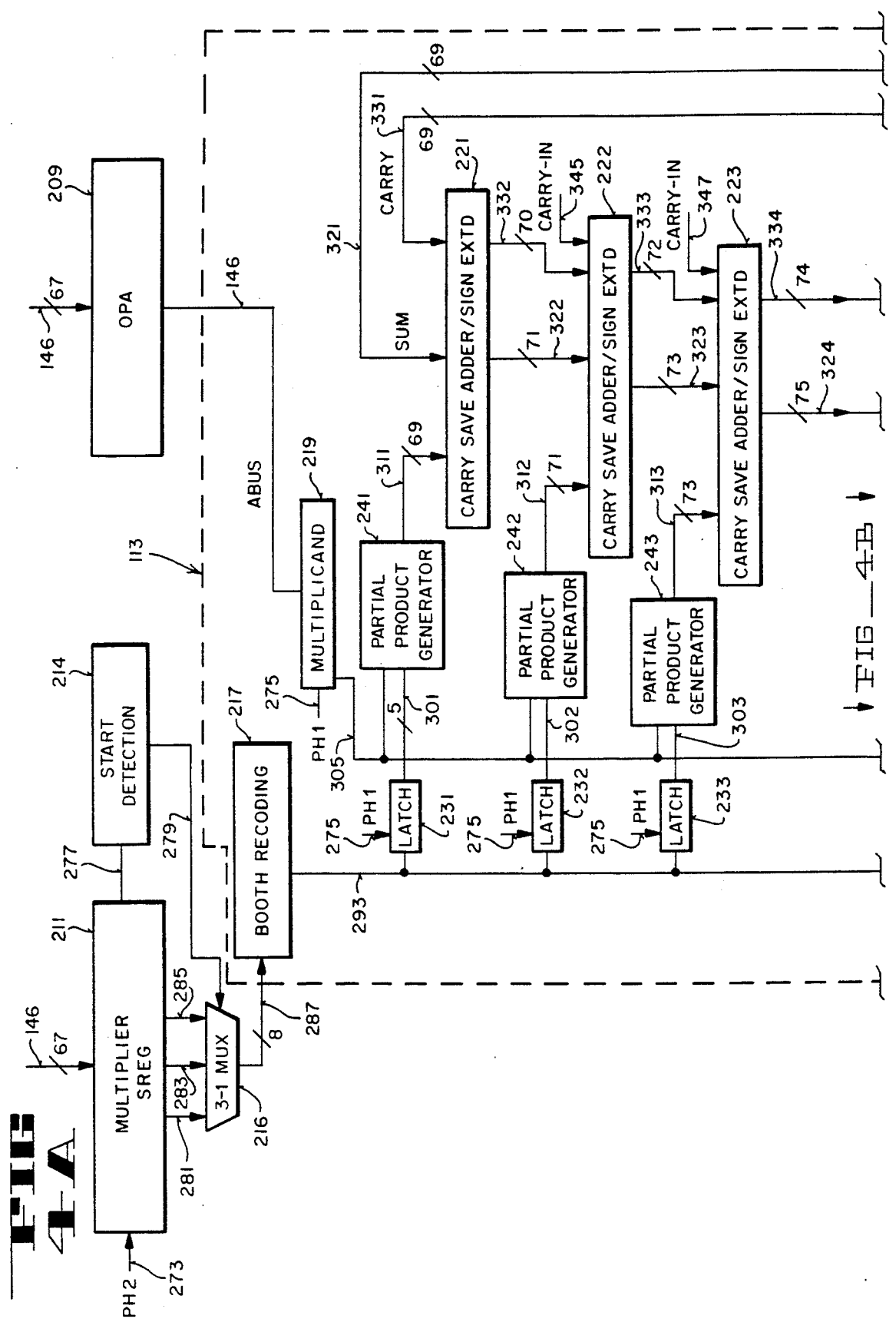

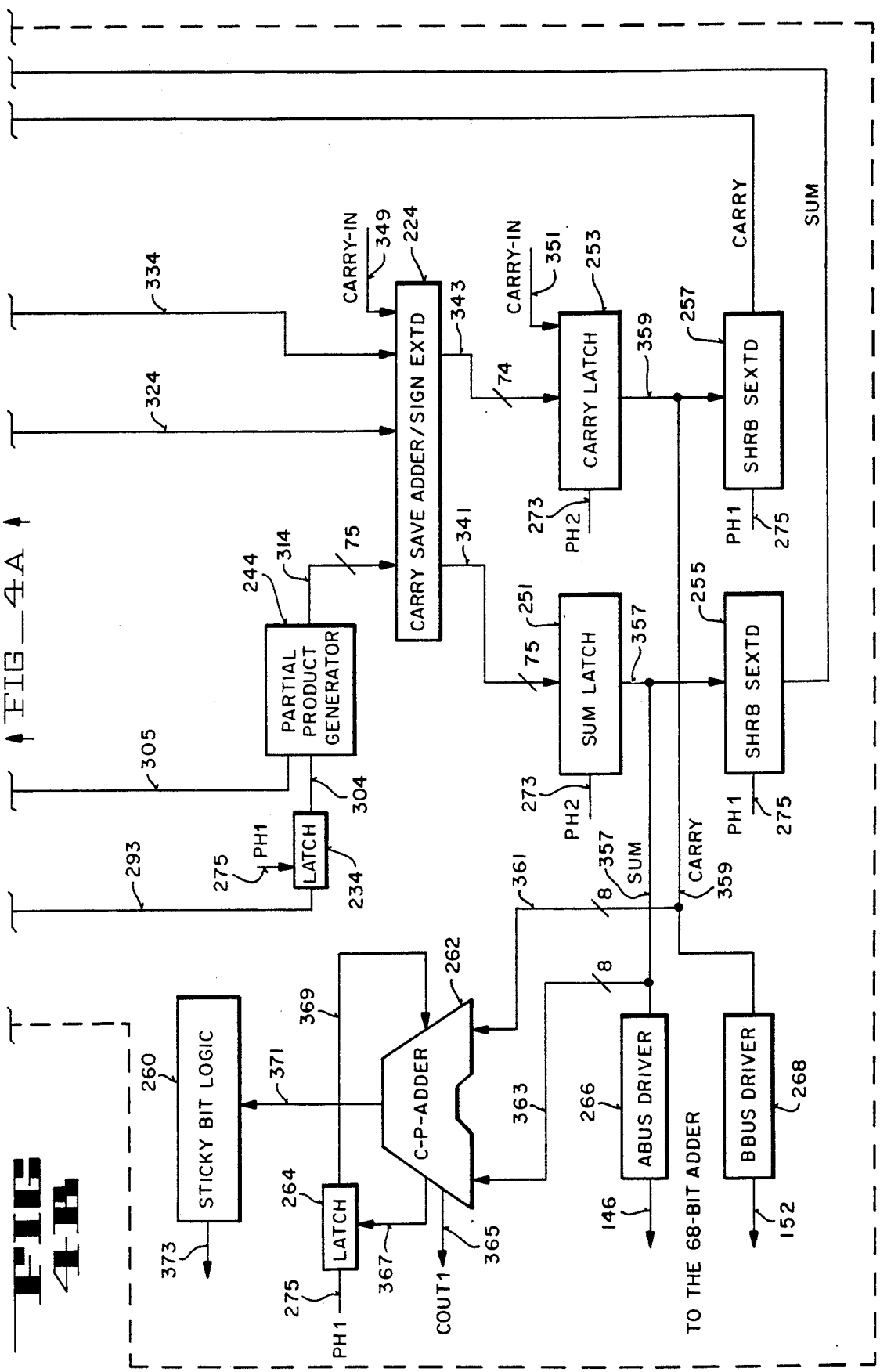

FIG_5
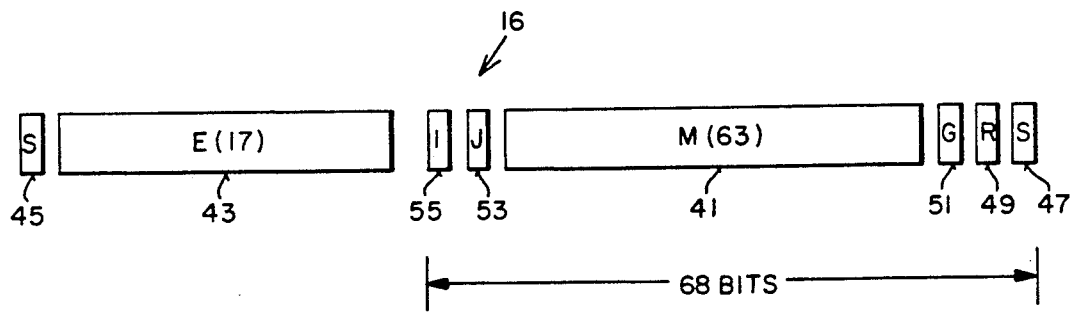
FIG_6
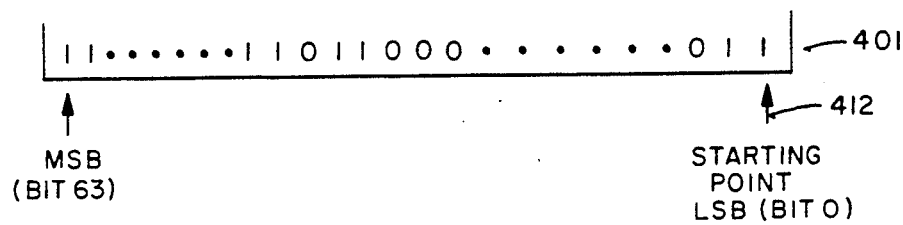
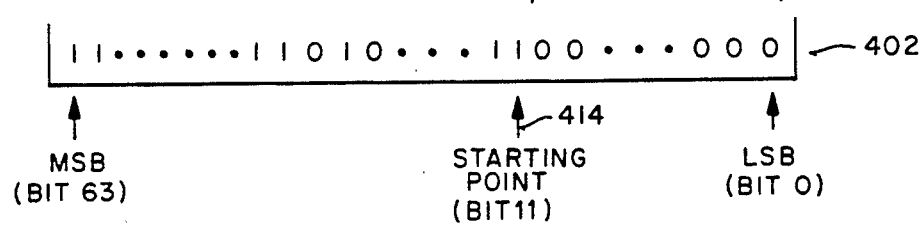
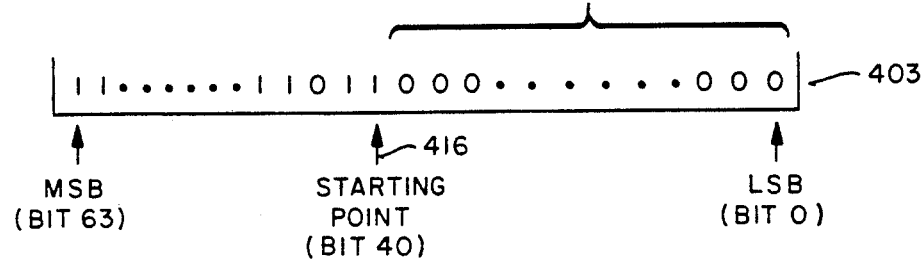

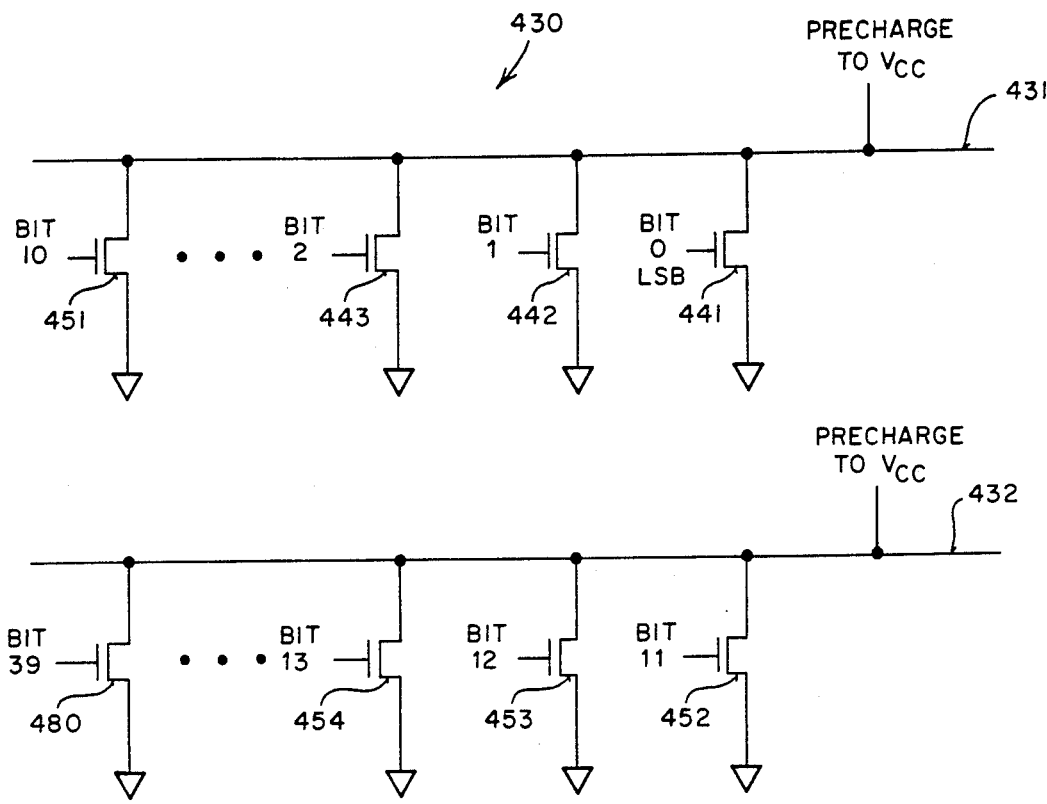
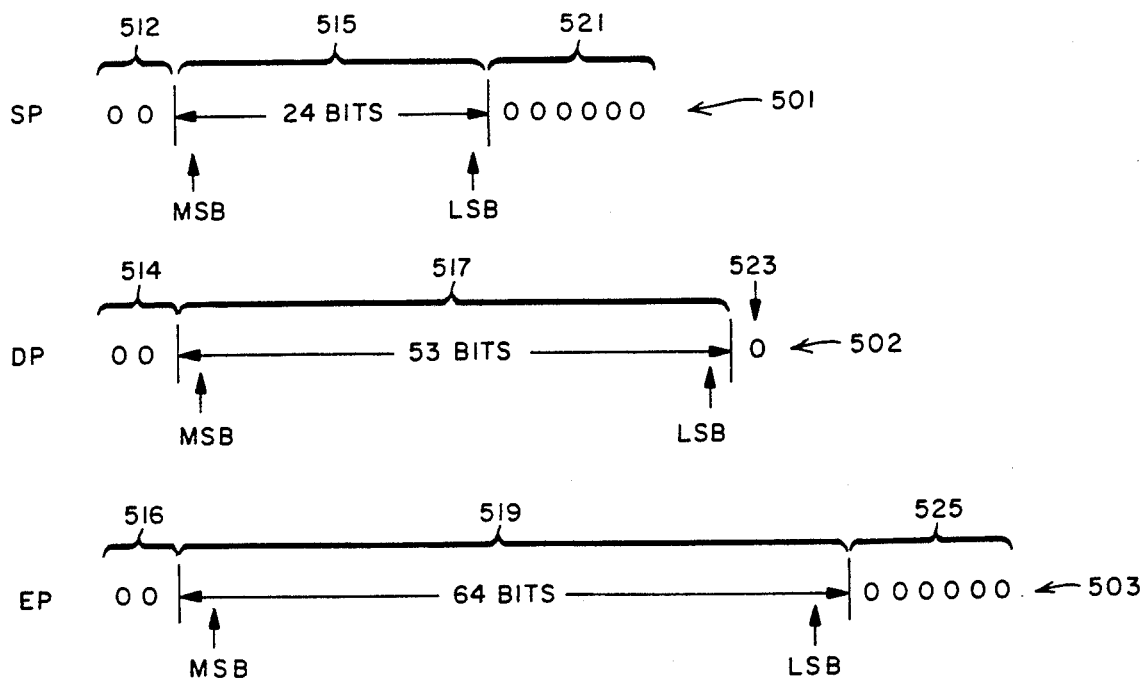

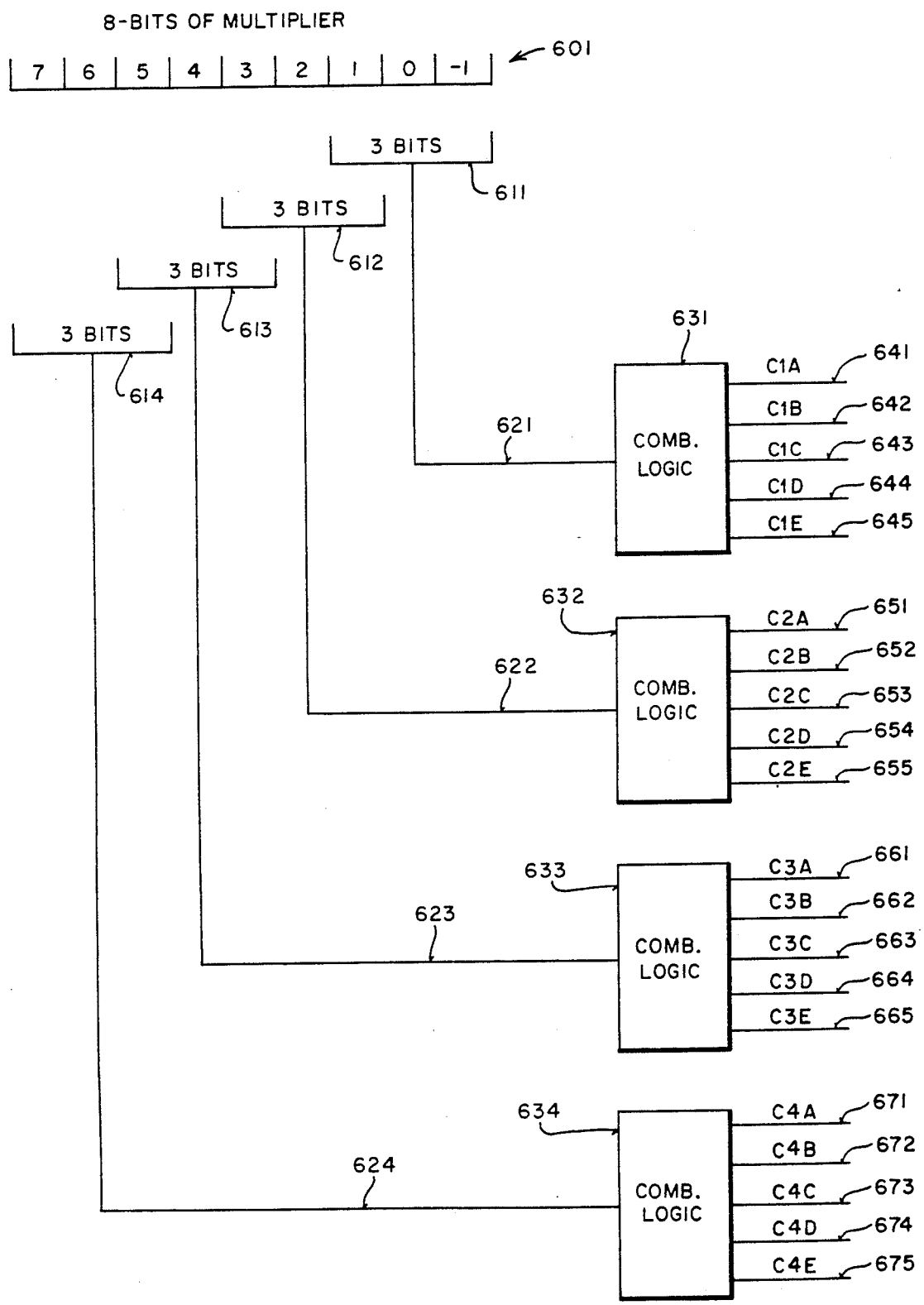
FIG_9

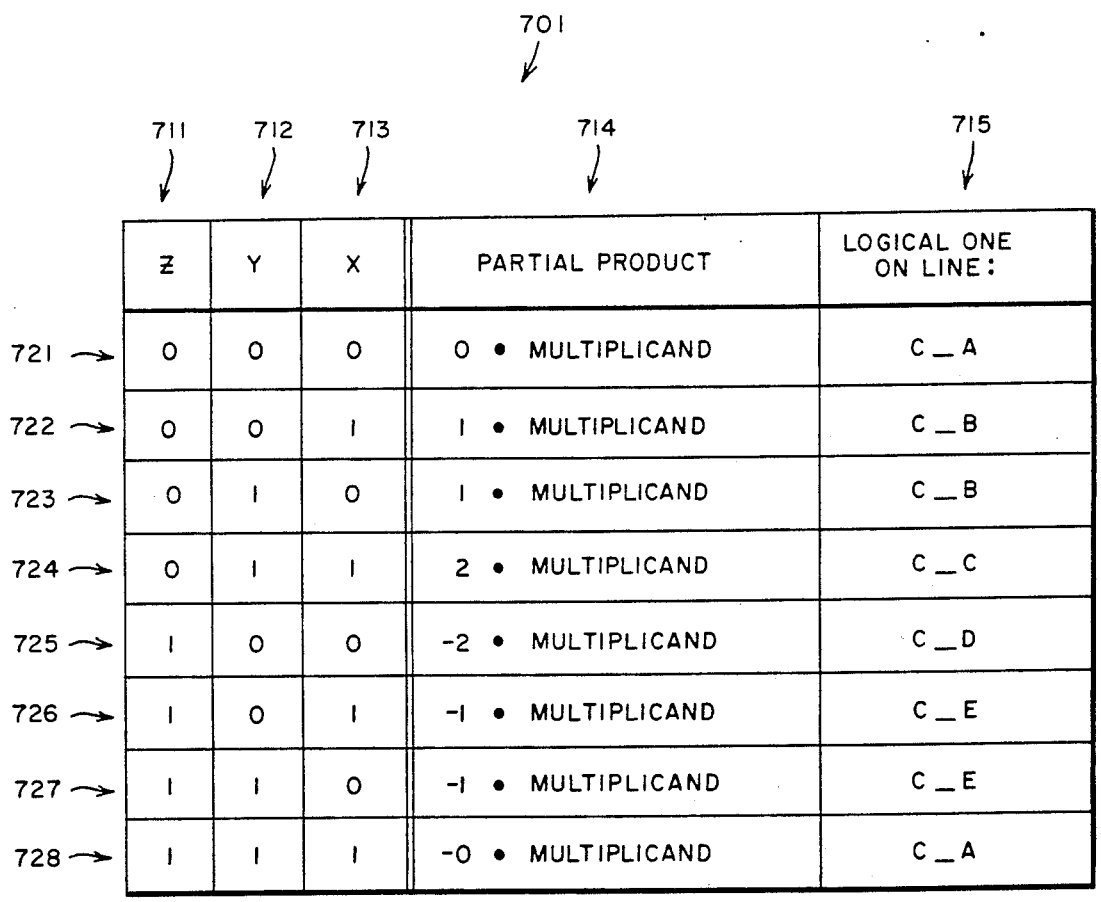
FIG_10

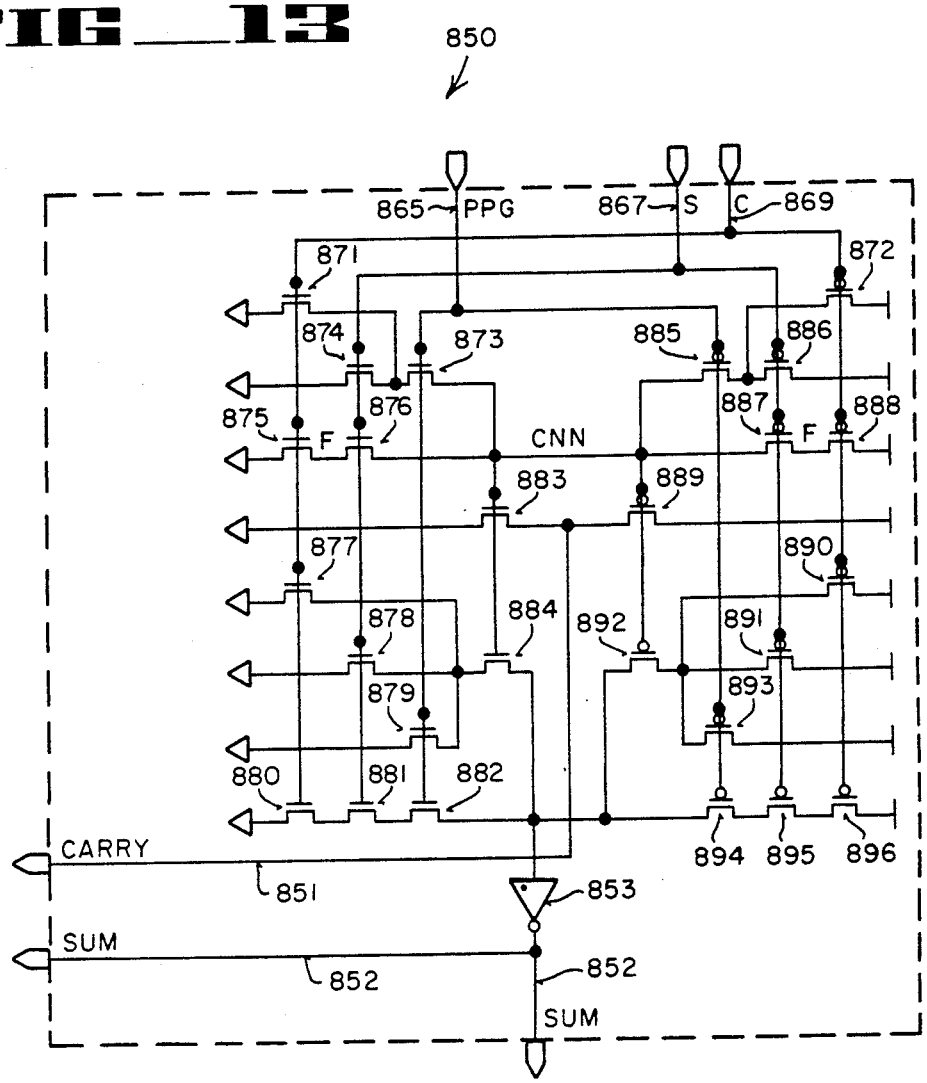
FIG_13
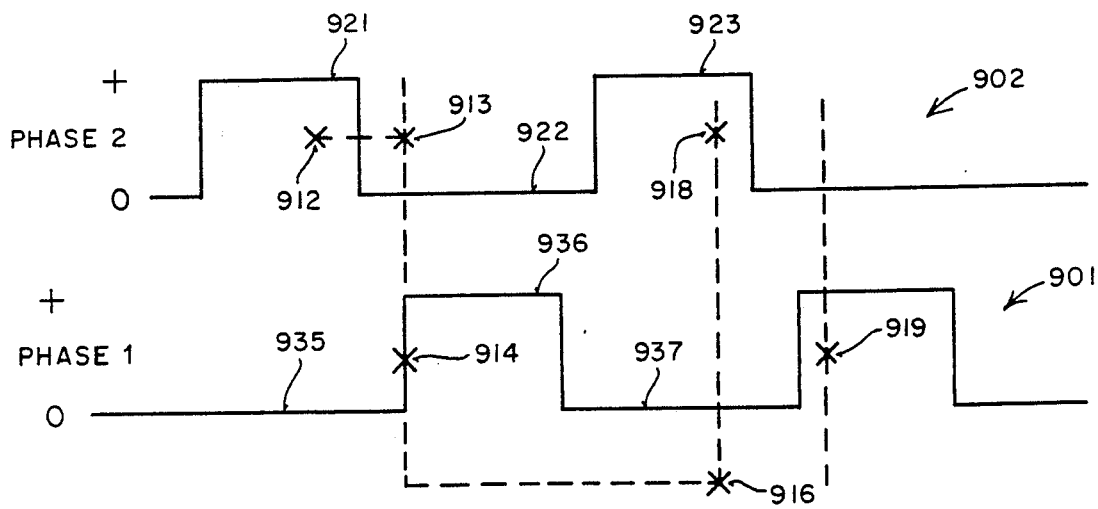
FIG_14

METHOD AND CIRCUITRY FOR DIGITAL SYSTEM MULTIPLICATION

FIELD OF THE INVENTION

The present invention pertains to the field of multiplication in a digital system. More particularly, this invention relates to methods and circuitry for improving multiplication in a digital system.

BACKGROUND OF THE INVENTION

Prior digital systems, including digital computers, have used various algorithms for signed and unsigned binary multiplication. FIG. 1 illustrates a simple example of prior art binary multiplication. A binary multiplicand is multiplied by a binary multiplier. A series of shifted partial products are formed, given that the only possible values of the multiplier digits are zero and one. The shifted partial products are then added, resulting in a product. When an N-bit word is multiplied by an M-bit word in a digital system, the resulting product will be N+M bits in length. Thus, a four-bit multiplicand times a four-bit multiplier results in an eight-bit product, as shown in FIG. 1.

In simple binary multiplication, partial products are formed by using one-bit of the multiplier at a time, starting with the least significant bit of the multiplier. The simplest way to generate partial products is to use AND gates as bit-by-bit multipliers. Using this simple multiplication technique, an N-bit multiplier generates N partial products.

Prior approaches have used encoding techniques to reduce the number of partial products. Reducing the number of partial products reduces the number of additions that need to be performed. Reducing the number of additions in turn reduces the number of clock cycles necessary for binary multiplication. One prior approach uses a modified Booth's algorithm as an encoding technique to reduce the number of partial products by one-half.

In a modified version of Booth's algorithm, each multiplier is divided into substrings of three-bits, with adjacent groups sharing a common bit. In one prior approach, the common bit is a prior bit. An encoding table is used to set forth the multiplication operation to be used for each of the eight permutations of the three multiplier bits.

Booth's algorithm can be used with either unsigned or two's complement numbers. In past approaches, multipliers have been padded with one or more zeroes to the right if necessary to form complete groups of three-bits each. To work with unsigned numbers, the multipliers have also been padded with one or two zeroes to the left.

Once shifted partial products are formed, they must be added together. Several types of conventional adders exist. One conventional two-input adder is called a carry propagate adder ("CPA"). The carry propagate adder adds a sum vector to a carry vector to produce one final sum. A CPA is a type of full adder. A full adder has three inputs and two outputs.

Another type of adder is the carry-save adder ("CSA"). CSA full adders and CSA half adders exist. A half adder has only two inputs, and it produces a sum and carry output. Carry-save adders are useful when multiple additions are performed.

Carry-save adders save the carry propagation until all the additions are completed. In one past approach, a carry propagate adder is then used during a final clock cycle to complete the carry propagation for all the additions.

The multiplication of negative numbers has been handled by converting a number into its two's complement form. If a number is positive, the two's complement of that number is the number itself. If a number X is negative, the two's complement of X is $2\exp(n) - |X|$, wherein n is the number of bits in a storage location and X is less than zero. If the absolute value of X is less than $2\exp(n-1)$, then the left-most bit of a negative number is always a one. Two's complement addition is the same as the addition of two positive numbers.

One prior multiplier multiplies eight-bits per clock cycle using straight multiplication. Eight carry-save adders are used in that prior multiplier.

In another prior approach, Booth's algorithm is used in generating partial products, and stages of carry-save adders, plus a carry propagate adder at a final stage, is used to obtain a final product.

Multiplication is one of several floating-point operations. A floating-point number includes a mantissa, an exponent, and a sign bit that indicates the sign of the mantissa. For floating-point multiplication, the exponents are added and the mantissas are multiplied. The result is then normalized.

FIG. 2 illustrates examples of floating-point numbers. Single precision floating-point 10 includes a sign bit 25, an 8-bit exponent portion 23, and a 23-bit mantissa portion 21. Double precision floating-point number 12 includes a sign bit 31, an 11-bit exponent portion 29, and a 52-bit mantissa portion 27. Extended precision floating-point 14 includes a sign bit 39, a 15-bit exponent portion 37, a J-bit 35, and a 63-bit mantissa 33. The J-bit corresponds to the bit to the left of the decimal point in a floating-point number.

As seen above, the floating-point formats yield relatively long mantissas to be multiplied. Therefore, for a digital computer using the floating-point formats, the performance of the computer's multiplication circuitry becomes a key factor in the computer's overall floating-point performance.

SUMMARY AND OBJECTS OF THE INVENTION

In view of known systems and methods, one of the objectives of the present invention is to optimize the performance of multiplication in a digital system.

This and other objects of the invention are provided for by method and circuitry for optimizing a speed of a subsequent multiplication in a digital system of a first number by a second number. The second number has bit positions including (1) a bit position of order X which is a least significant bit position of the second number, (2) a bit position of order Y, and (3) a bit position of order Z wherein X is less than Y and Y is less than Z. A detection is done to determine whether a string of consecutive zeroes occupies the bit positions of the second number beginning with the bit position X and increasing toward higher order bit positions. If no such string of consecutive zeroes exists, then bit position X is used as a starting point for the second number for multiplication. If both (i) the string of consecutive zeroes exists and (ii) the string of consecutive zeroes has its highest order zero in a bit position having an order less than $Y-1$, then bit position X is used as a starting point for the second number for multiplication. If both (i) the string of consecutive zeroes exists and (ii) the string of consecutive zeroes has its highest order zero in a bit position having an order less than $Z-1$, but greater than or equal to $Y-1$, then bit position Y is used as a starting point for the second number for multiplication. If both (i) the string of consecutive zeroes exist, and (ii) the string of consecutive zeroes has its highest order zero in a bit position having an order greater than or equal to $Z-1$, then bit position Z is used as a starting point for the second number for multiplication.

The above-mentioned object and other objects of the invention are also provided for by a method and circuitry for optimizing multiplication clock cycles in a digital system. Prior to multiplying a first number by a second number comprised of N-bits using B 2-bit Booth algorithm pairs of bits of the second number per clock cycle, wherein B is a positive integer and N is a positive integer, the following steps are performed. The second number is padded with a zero in each of the two-bit positions to the left of the most significant bit position of the second number. The second number is padded with a zero in each of the C-bit positions to the right of the least significant bit position of the second number. $C = D - (N+2)$, wherein D is a smallest positive integer that is a multiple of $B \times 2$ that will also yield a C that is either zero or a positive integer. The first number is multiplied by the second number using B 2-bit Booth algorithm pairs of bits of the second number per clock cycle.

The above-mentioned objects and other objects of the invention are also provided for by a method and circuitry for multiplication in a digital system. A partial product generator generates a first multibit-output and a first carry-in output. A carry-save adder adds (1) the first multibit output from the partial product generator (2) a sum applied as a sum input into the carry-save adder, and (3) a carry applied as a carry input into the carry-save adder. A sum output of the carry-save adder is latched into a sum latch. A carry output of the carry-save adder is latched into a sequence of bit positions of the carry latch, wherein the first position of the sequence of bit positions is of a next highest order from a least significant bit position. The first carry-in output of the partial product generator is latched into the least significant bit position of the carry latch. The following are added: (1) the lease significant T bits of the sum from the sum latch, (2) the least significant T bits of the carry from the carry latch, and (3) a final stage carry-in bit, wherein T is a positive integer. The most significant carry bit from the addition of the least significant T sum bits from the sum latch and the least significant T carry bits from the carry latch is stored. The least significant T sum bits from the sum latch are truncated and the result is stored. The least significant T carry bits from the carry latch are truncated and the result is stored. The above steps are repeated. The first multibit output of the partial product generator becomes a second multibit output of the partial product generator. The first carry-in output of the partial product generator becomes a second carry-in output of the partial product generator. The truncated sum becomes a sum applied as a sum input to the carry-save adder. The truncated carry becomes a carry applied as a carry input to the carry-save adder. The stored most significant carry bit from the addition of the least significant T sum bits and T carry bits becomes the final stage carry-in bit.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings in which like references indicate similar elements and in which:

FIG. 1 illustrates an example of prior art binary multiplication;

FIG. 2 illustrates examples of prior art formats of floating-point numbers;

FIG. 3 is a block diagram of the architecture of a floating-point unit of a microprocessor;

FIGS. 4A and 4B comprise a block diagram of circuitry of a multiplier;

FIG. 5 illustrates the internal format of a floating-point number used by the microprocessor;

FIG. 6 illustrates examples of starting points used by the multiplier of the microprocessor;

FIG. 7 illustrates zero detect circuitry of the multiplier;

FIG. 8 illustrates examples of padding used by the multiplier of the microprocessor;

FIG. 9 is a block diagram of the implementation of Booth's recoding technique by the multiplier;

FIG. 10 is a logic table for the Booth algorithm for the multiplier;

FIG. 13 illustrates circuitry of a carry-save adder of the multiplier;

FIG. 14 is a timing diagram for the multiplier.

DETAILED DESCRIPTION

Figure 11:
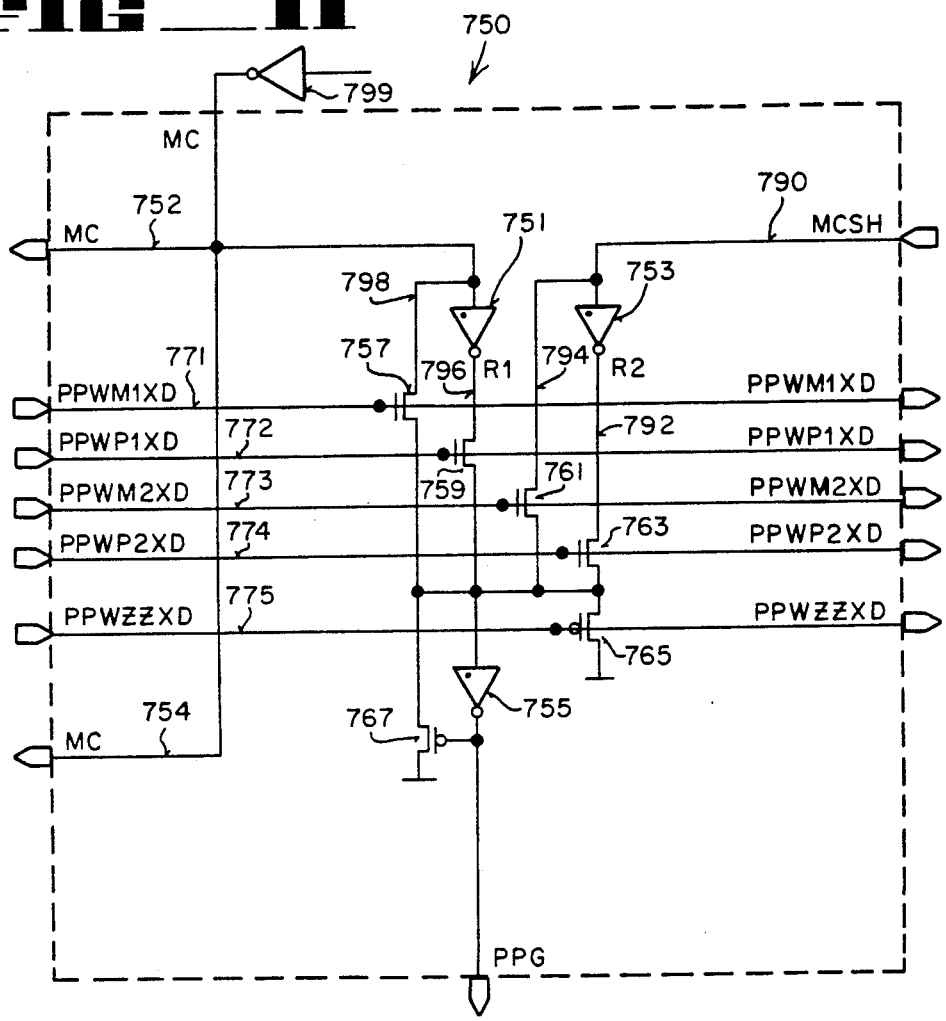
FIG. 11 illustrates circuitry for one-bit for a partial product generator of the multiplier.

FIG. 3 is a block diagram of the architecture of floating-point unit 78. Floating-point unit 78 is concerned with the execution of basic arithmetic floating-point operations and floating-point unit 78 is part of a microprocessor. Floating-point unit 78 contains the logic to execute the floating-point instruction set associated with the microprocessor.

Floating-point unit 78 includes a dedicated mantissa multiplier 113 capable of multiplying 8-bits per clock cycle. Mantissa multiplier 113 is described in more detail below.

The instruction decode, address calculation, and control functions for floating-point instructions are carried out by the portion of the microprocessor outside of floating-point unit 78 as an extension of the integer instructions charter for the microprocessor. R bus 138 and M bus 140 are part of the main data path for the microprocessor, and are also coupled to floating-point unit 78. Floating-point unit 78 sends data to and receives data from the microprocessor over R bus 138 and M bus 140. Interface unit 101 is responsible for moving between (1) R bus 138 and M bus 140, and (2) mantissa latch 104 and exponent latch 102.

Incoming data to interface unit 101 could be floating-point real numbers. The exponent portions of those floating-point real numbers are latched into exponent latch 102. The mantissa portions of those floating-point real numbers are latched into mantissa latch 104. Exponent latch 102 is coupled to exponent EXA bus 182. Mantissa latch 104 is coupled to mantissa Abus 146.

The mantissa data path is shown on the right side of FIG. 3. The mantissa data path comprises accumulator 105, mantissa adder 107, operand registers 109 (which includes register OPA 209), shifter 111 (which includes register SREG 211), mantissa multiplier 113, and mantissa ROM 115. Control for the mantissa data path comes from control logic 119.

Stack unit 103 contains registers forming a stack. Stack unit 103 is coupled to both Abus 146 and EXA bus 182, and is thus part of both the mantissa and exponent paths.

The exponent data path is shown on the left side of FIG. 2 and comprises exponent adder 123, multiplexer 125, operand register EXA 127, operand register EXB 129, and exponent ROM 131. The exponent data path also includes EXA bus 182 and EXB bus 192. All control and random logic for the exponent data path is contained in control logic unit 119.

Trap logic circuitry 121 includes latches, bus drivers, peripheral random logic, and user visible registers, including a control word register and a status word register.

Control logic 119 receives microinstructions on lines 87 from the microprocessor and in turn provides control for floating-point unit 78. Control logic 119 sends out Fbusy and Ferror signals on lines 212. Control logic 119 is coupled to trap circuitry 121 via lines 180. Control logic 119 is coupled to shift count value ("SCVAL") bus 160. Control logic 119 is coupled to accumulator 105 via lines 172. Control logic 119 is also coupled to loop counter 117 via lines 176.

FIG. 4 is a block diagram of dedicated mantissa multiplier 113 of floating-point unit 78. FIG. 4 also illustrates SREG 211, OPA register 209, start detection circuitry 214, and three-to-one multiplexer 216. Register SREG 211 is located in shifter unit 111, and is coupled to mantissa Abus 146. Register OPA 209 is part of operand registers unit 109, and is coupled to Abus 146. Start detection circuitry 214 and three-to-one multiplexer 216 are located in shifter unit 111. Multiplexer is coupled to Booth recoding circuitry of multiplier 113 via lines 287. Register SREG 211 is coupled to three-to-one multiplexer 216 via lines 281, 283, and 285. Register OPA 209 is coupled to register 219 of multiplier unit 113 via Abus 146.

The two mantissas to be multiplied by mantissa multiplier 113 comprise a mantissa multiplicand and a mantissa multiplier. The mantissa multiplicand is stored in OPA register 209. The mantissa multiplier is stored in register SREG 211.

The mantissa multiplicand and the mantissa multiplier can come from the microprocessor over M bus 140 (if the floating point number has a width of 32-bits or less) or over M bus 140 and R bus 138 (if the floating point number has a width greater than 32-bits). The mantissa multiplicand can also come from a stack within floating point unit 78 or from a previous result stored within floating point unit 78.

Floating-point numbers of floating-point unit 78 have the format of floating-point number 16 shown in FIG. 5. Floating-point number 16 has a sign bit 45, a 17-bit exponent portion 43, an I-bit 55, a J-bit 53, a 63-bit mantissa or fraction portion 41, a guard bit 51, a round bit 49, and a sticky bit 47. The J-bit 53 corresponds to the bit to the left of the decimal point in the floating-point number. I-bit 55 represents the sign of the integer. Guard bit 51, round bit 49, and sticky bit 47 are used internally by floating-point unit 78 for rounding purposes and for information regarding precision, and are not sent to or from the user of the microprocessor. Guard bit 51, round bit 49, and sticky bit 47 can be stored in registers OPA 209 and SReg 211, for example.

For multipliers and multiplicands of those numbers that are sent over M bus 140 and/or R bus 138, interface unit 101 of FIG. 3 latches sign bit 45 and 17-bit exponent portion 43 in exponent latch 102. Interface unit 101 also latches I-bit 55, J-bit 53, and 63-bit mantissa portion 41, in mantissa latch 104. Mantissa latch 104 thus stores 65-bits.

Floating-point multiplication involves adding exponents and multiplying mantissas. The exponent data path referred to above of floating-point unit 78 adds the exponents of the multiplicand floating-point number and the multiplier floating-point number. The mantissas are multiplied by mantissa multiplier 113.

The mantissa multiplicand is stored in OPA register 209. The mantissa multiplier is stored in register SREG 211.

Start detection circuitry 214 and three-to-one multiplexer 216 shown in FIG. 4 are used to obtain an optimum multiplication starting point within the bits of the mantissa multiplier stored in register SREG 211. The starting point bits plus the bits of higher significance than the starting point bit then become the only bits of the mantissa multiplier that are multiplied times the multiplicand stored in register OPA 209. The bits of lower significance than the starting point bit are ignored. In the preferred embodiment of the present invention, lower order bits reside on the right side of the mantissa, and higher order bits reside on the left side of the mantissa. In other words, the bits to the right of the starting point bit are ignored.

As set forth above, register SREG 211 contains an I-bit 55 of zero, a J-bit 53, a 63-bit mantissa portion 41, a guard bit 51, a round bit 49, and a sticky bit 47. The I-bit 55, guard bit 51, round bit 49, and sticky bit 47 are all zero for the multiplier in SREG 211, and thus the pertinent part of the number stored in SREG 211 for this description is the 63-bit mantissa portion 41 plus J-bit 53 (i.e., a total of 64 bits). The starting point bit for the mantissa multiplier stored in register SREG 211 is always somewhere to the left of guard bit 51.

Start detection circuitry 214 determines the optimum multiplication starting point by looking for a string of trailing zeroes in the the mantissa multiplier stored in register SREG 211.

FIG. 6 illustrates the operation of start detection circuitry 214 and three-to one multiplexer 216. Binary number 401 is an example of a mantissa multiplier stored in register SREG 211. (Given that guard bit 51, round bit 49, sticky bit 47, and I-bit 55 are zero, they are not pertinent to this discussion and will be ignored). Binary 401 is comprised of 63-bit mantissa portion 41 and J-bit 53, which will hereinafter will be referred to simply as the mantissa multiplier. The rightmost bit of binary 401 the least significant bit of mantissa portion 41. The leftmost bit, which is J-bit 53, is the most significant bit of the mantissa multiplier stored in register SREG 211.

Referring to FIG. 6, zero detect circuitry of start detection unit 214 looks for a string of consecutive zeroes starting with the least significant bit of the mantissa multiplier. If no such string of consecutive zeroes exist, then the least significant bit (which is the mantissa bit of order zero) is used as the starting point for multiplication.

In a preferred embodiment of the present invention, two other bit positions besides bit position zero are established beforehand as possible starting points for multiplication. In a preferred embodiment of the present invention, the three possible starting points would be bit position zero, bit position 11, and bit position 40, wherein bit position zero is the rightmost bit of the mantissa multiplier. These three starting points are established by having lines 281, 283, and 285 coupled between register SREG 211 and three-to one multiplexer 216.

Start detection unit 214 and multiplexer 216 are part of shifter unit 111. Start detection circuitry 214 sends a control signal to the three-to two multiplexer 216 via lines 279.

Each set of lines 281, 283, and 285 are comprised of eight individual lines, one per bit position.

The rightmost line of lines 285 is coupled between bit zero of the mantissa multiplier in register SREG 211, ignoring the guard, round, and sticky bits. The leftmost line of lines 285 is coupled to bit position 7 of the mantissa multiplier in register SREG 211. Each of the other 6 lines between the leftmost line and the rightmost line of lines 285 is coupled to a respective bit position between bit zero (the least significant bit) and bit 7 of the mantissa multiplier in register SREG 211.

Lines 283 are comprised of eight lines coupled between the mantissa multiplier in register SREG 211 and the multiplexer 216. The rightmost line of lines 283 is coupled between bit 11 of the mantissa multiplier in register SREG 211 and the multiplexer 216. The leftmost line of lines 283 is coupled between bit 18 of the mantissa multiplier in register SREG 211 and the three-to two multiplexer 216. The 6 lines of lines 283 between the leftmost line and the rightmost line are coupled to the respective 6-bit positions between bit 11 and bit 18 of the mantissa multiplier in register SREG 211.

Lines 281 comprise 8 lines coupled between the mantissa multiplier in register SREG 211 and multiplexer 216. The rightmost line of lines 281 is coupled between bit 40 of the mantissa multiplier and the multiplexer 216. The leftmost line of lines 281 is coupled between bit 47 of the mantissa multiplier 211 and the multiplexer 216. Each of the other lines of lines 281 between the leftmost line and the rightmost line is coupled to a respective bit between bit 40 and bit 47 of the mantissa multiplier and multiplexer 216.

Thus, each of the rightmost lines of the set of lines 281, 283, and 285 is coupled between a different starting point bit of the mantissa multiplier in register SREG 211 and the three-to two multiplexer 216.

FIG. 7 illustrates the zero detect logic 430 that is a part of start detection circuitry 214 of shifter unit 111 of floating-point unit 78. Zero detect logic is comprised of CMOS transistors 441 through 480 and lines 431 and 432. CMOS transistors 441 through 451 are coupled between line 431 and ground. The eleven transistors that comprise transistors 441 through 451 each has its gate coupled to a different respective bit of the mantissa multiplier stored in register SREG 211. Transistor 441, for example, has a gate coupled to bit zero of the mantissa multiplier stored in register SREG 211. The next transistor, transistor 442, has its gate coupled to bit 1 of the mantissa multiplier in register SREG 211, for example. The gate of transistor 451 is coupled to bit 10 of the mantissa multiplier in register SREG 211.

Transistors 452 through 480 comprise twenty-nine transistors that are coupled between line 432 and ground. Each respective gate of CMOS transistors 452 through 480 is coupled to a different respective consecutive bit of the mantissa multiplier stored in register SREG 211, starting with bit 11 and ending with bit 39.

Lines 431 and 432 are initially precharged to a positive voltage Vcc. If each and every bit of bits 0 to bit 10 is a logical 0, then line 431 will stay precharged to positive voltage Vcc. But if any one of the bits 0 through 10 is a logical one, then the transistor associated with that bit will be turned on, resulting in a path to ground for line 431. Thus line 431 will lose its precharge voltage if any one of the bits 0 through bit 10 is a logical one. That would result in line 431 having a 0 voltage.

Correspondingly, if each and every one of the bits 11 through bit 39 is a logical zero, then each and every one of the transistors 452 through 480 will stay turned off. Thus, line 432 would retain its precharge voltage of Vcc. But if any one of the bits 11 through 39 is a logical one, then the transistor associated with that bit will be turned on, providing a path to ground for line 432. Line 432 would thus lose its precharge voltage Vcc if any one of the bits 11 through 39 is a logical one.

The combinational logic in start detection circuitry 211 detects the precharge on lines 431 and 432. If both lines 431 and 432 stay precharged to positive voltage Vcc for a given mantissa multiplier in register SREG 211, that means that there is a consecutive string of trailing zeroes in bits 0 through bit 39 of the mantissa multiplier in register SREG 211. In other words, each and every bit of bits 0 through bit 39 would be a zero. In that case, start detection circuitry would send a signal to the three-to-two multiplexer 216 to send the bits on lines 281 to Booth recoding circuitry 217 via lines 287. In other words, bit 40 of the mantissa multiplier in register SREG 211 would be used as the starting point for multiplication. An example of a case of a string of consecutive zeroes in bits 0 through bit 39 is shown by binary number 403 in FIG. 6. FIG. 6 shows starting point 416 at bit 40, with a string of consecutive zeroes to the right of the starting point.

If the combinational logic of start detection circuitry 214 instead finds that line 431 retains a precharge of a positive voltage Vcc and that line 432 loses its voltage of Vcc and has a zero voltage, then the start detection circuitry will send a signal to the multiplexer 216 via lines 279 to have multiplexer 216 transfer the bits on lines 283 to Booth recoding circuitry 217 via lines 287. In this situation, there would be a string of consecutive trailing zeroes in bits 0 through bit 10. This would also indicate that one of the bits of bits 11 through 39 was a logical one. Bit 11 would be used as the starting point of multiplication of the mantissa multiplier in register SREG 211. An example of this situation is shown by binary number 402 in FIG. 6. For binary number 402 there is a string 421 of consecutive trailing zeroes between bit 0 and bit 10. Bit 11 is used as starting point 414.

If the combinational logic of start detection circuitry 214 finds that line 431 does not retain its precharge voltage of Vcc for a respective mantissa multiplier in register SREG 211, then bit 0 of the mantissa multiplier in register SREG 211 would be used as the starting point for multiplication. An example of this situation is shown by binary number 401 in FIG. 6. There is no string of consecutive zeroes for the least significant bits for binary number 401, so starting point 412 is located at bit zero. This situation would occur if at least one of bits 0 through 10 was a logical one. A starting point of bit 0 means that combinational logic of start detection circuitry 214 would send a signal to the three-to two multiplexer 216 via lines 279 to send the bits on lines 285 to Booth recoding circuitry 217 via lines 287.

Thus, the three-to one multiplexer 216 controlled by start detection circuitry 214 determines which starting point (plus the 7 bits to the left of the starting point) is sent to Booth recoding circuitry 217 via lines 287.

To summarize, if the starting detection circuitry 214 determines that a string of consecutive zeroes exist and that the string of consecutive zeroes has its highest order zero in the bit position 9, then bit position 0 (the least significant bit) is used as the starting point for multiplication of the mantissa multiplier in register SREG 211. If, on the other hand, start detection circuitry 214 determines that a string of consecutive trailing zeroes exist and that the string of consecutive trailing zeroes has its highest order zero in a bit position less than 38 but greater than or equal to 10, then bit 11 is used as a starting point for multiplication of the mantissa multiplier in register SREG 211. But if start detection circuitry 214 determines that a string of consecutive trailing zeroes exist and that the string of consecutive trailing zeroes has its highest order zero in a bit position having an order greater than or equal to 39, then bit position 40 is used as a starting point for multiplication of the mantissa multiplier in register SREG 211. If multiplier is all zeroes, no multiplication is performed. The control logic will place a zero result in accumulator 105 (of FIG. 3).

If no string of consecutive zeroes exist, then bit zero is used as a starting point for multiplication of the mantissa multiplier in register SREG 211.

Referring to FIG. 6, it can be seen that a starting point for multiplication of bit zero corresponds to an extended precision floating-point multiplier being stored in register SREG 211. A starting point of bit 11 corresponds to a double precision floating-point mantissa multiplier being stored in register SREG 211. Moreover, a starting of bit 40 corresponds to a single precision floating-point mantissa being stored in register SREG 211.

By using starting points of bit 11 and bit 40, multiplication clock cycles can be saved because the rightmost string of consecutive trailing zeroes do not need to be run through the rest of mantissa multiplier circuitry 113.

Using bit 40 as a starting point saves five clock cycles for a single precision number for multiplier 113. Using bit 11 as a starting point for a double precision floating-point mantissa in register SREG 211 at worst saves one clock cycle. But if the double precision number has a string of trailing zeroes from bit zero through bit 39, then five clock cycles can be saved from a subsequent multiplication by mantissa multiplier 113. No clock cycles would be saved for an extended precision number that did not have any trailing consecutive zeroes. But if an extended precision number did have trailing consecutive zeroes from bit zero through bit 10, then one clock cycle would be saved in a subsequent multiplication by multiplier 113. If the extended precision number had a string of trailing consecutive zeroes from bit 0 through bit 39, then bit 40 could be used as a starting point and five clock cycles would be saved for multiplier 113.

In alternative embodiments of the present invention, bits other than bits 0, 11, and 40 could be used as starting points.

Multiplexer 216 of FIG. 4 extracts 8-bits from one of three starting points in the mantissa multiplier to send to Booth recoding circuitry 217 via lines 287. Lines 287 consist of eight parallel lines which go to latches and logic within Booth recoding circuitry 217. The transfer of 8-bits from multiplexer 216 to Booth recoding circuitry 217 occurs each phase two of every clock cycle.

The bits of the mantissa multiplier starting with the starting point bit and going to the left are all eventually sent to Booth recoding circuitry 217 because in each phase two of every clock cycle, the multiplier in register SREG 211 is shifted right by 8 bits. Thus, in every phase two of every clock cycle, multiplexer 216 sends a different group of 8-bits to Booth recoding circuitry 217 until all the bits to the left of the starting point bit and the starting point bit are sent to Booth recoding circuitry 217.

As the mantissa multiplier in register SREG 211 is being shifted right, zero-bits are being left shifted into register SREG 211. For example, if a starting point of bit 11 is chosen by starting detection circuitry 214, the final group of eight bits passed to Booth recoding circuitry 217 via multiplexer 216 will include zero bits to the left of the most significant bit (i.e., bit 63).

Booth recoding circuitry 217 includes latches to keep information needed for a given clock cycle. Booth recoding circuitry can use bits from a previous clock cycle.

Mantissa multiplier 113 uses a 2-bit Booth recoding algorithm in generating partial products. Binary multiplication involves the formation of partial products and the addition of partial products. In order to generate partial products, multiplier circuitry 113 includes Booth recoding circuitry 217, latches 231, 232, 233, and 234, partial product generators 241, 242, 243, and 244, carry-in lines 345, 347, 349, 351, sum latch 251, and carry latch 253. In order to add the partial products generated, mantissa multiplier 113 includes (1) four stages of carry-save adders (with sign extenders) 221, 222, 223, and 224, (2) sum latch 251 and carry latch 253, (3) truncation and register units 255 and 257, (4) 8-bit carry propagate adder 262 and (5) 68-bit carry propagate mantissa adder 107 (shown in FIG. 3).

Multiplier 113 uses a Booth recoding algorithm so that partial products are formed for more than one bit at a time. The 2-bit Booth algorithm used by multiplier 113 reduces the number of partial products by one-half. Reducing the number of partial products reduces the number of additions that needs to be performed, which in turn reduces the number of clock cycles necessary for mantissa multiplication.

The Booth algorithm used by Booth recoding circuitry 217 is as follows. The mantissa multiplier bits received by Booth recoding circuitry 217 from register SREG 211 in groups of 8-bits are divided into 2-bit groups (i.e., pairs). Three bits (i.e., triplets) are scanned at a time, however, by Booth recoding circuitry 217. Each 3-bit triplet is comprised of 2-bits from the present pair of bits plus a third bit from the high order bit of the next lower-order pair of bits. In effect, the high order bit of each pair is examined twice by Booth recoding circuitry 217. The scanning of triplets starts with the leftmost bit of the previous eight bits received by Booth recoding circuitry 217, and proceeds to the left towards higher order bits.

In multiplier 113, eight bits are sent to Booth recoding circuitry 217 for each phase two of every clock cycle because mantissa multiplier 113 uses four stages of carry-save adders. Thus, multiplier 113 processes four 2-bit Booth pairs per clock cycle.

Booth recoding circuitry 217 pads the mantissa multiplier with zeroes before applying the Booth algorithm to the mantissa multiplier. Padding refers to adding ones or zeroes to the left or right of a binary number. Booth recoding circuitry 217 includes latches, combinational logic, and control circuitry in order to perform the proper padding before implementing the Booth algorithm.

FIG. 8 illustrates the three types of padding done by Booth recoding circuitry 217. In groups of eight bits for every phase two of every clock cycle, Booth recoding circuitry 217 receives either a single precision mantissa, a double precision mantissa, or an extended precision mantissa.

Padding is done by Booth recoding circuitry 217 to optimize the number of multiplication clock cycles performed by multiplier 113 in order to achieve a result. A number is padded by Booth recoding circuitry 217 to achieve a positive integer multiple of eight because multiplier 113 processes a minimum of eight bits per clock cycle.

Binary number 501 represents a single precision number after being padded by Booth recoding circuitry 217. Two bits 512 are padded to the left of mantissa 515 of the single precision number. Likewise, two bits 514 are padded to the left of double precision 517 and two bits 516 are padded to the left of extended precision number 519.

Booth recoding circuitry 217 also pads numbers received to the right. The padding done by Booth recoding circuitry 217 on the right is done to achieve a number that is the smallest integer multiple of eight for a given mantissa sent to Booth recoding circuitry 217 and padded with two-bits to the left.

For example, single precision 501 is padded with six-bits 521 to the right of mantissa 515. The resulting number 501 has a total of 32-bits. The number 32 is equal to four times eight and thus is a positive integer that is a multiple of eight. Binary multiplier 501 comprised of 32-bits would be processed in four clock cycles by multiplier 113.

Double precision binary number 502 is padded on the right with zero 523 by Booth recoding circuitry 217 prior to being multiplied. Without the padding 523 to right of mantissa 517, the number 502 would be comprised of only 55 bits. The number 55, of course, is not a positive integer multiple of the number eight. The smallest positive integer multiple of the number eight greater than the number fifty-five is of course the number fifty-six. Therefore, only one padding bit 523 is necessary for double precision number 502. Given that multiplier 113 processes 8-bits per clock cycle, and that double precision number 502 has fifty-six bits including padding, it therefore takes seven clock cycles for multiplier 113 to process double precision number 502.

Booth recoding circuitry 217 pads six zeroes 525 to the right of mantissa 519 of extended precision number 503. Without the six bit padding to the right, extended precision number 503 would only be comprised of 66 bits (i.e., a 64-bit mantissa plus two-bit padding to the left). The number 66 is not a positive integer multiple of the number eight. The next highest positive integer multiple of eight is the number seventy-two, so Booth recoding circuitry 217 pads six bits to the right for extended precision number 503, yielding a total of 72-bits. Given that multiplier 113 processes eight bits per clock cycle, 72-bit extended precision number 503 is processed in nine clock cycles.

Padding the single precision, double precision, and extended precision numbers with two bits to the left and respectively six bits, one bit, and six bits to the right also serves to reduce the number of clock cycles required for processing the double precision number by one clock cycle. For example, if double precision number 502 were instead padded with eight bits to the left and three bits to the right to form a number comprised of 64-bits, then it would take eight clock cycles for multiplier 113 to process a the double precision number so padded. But since a double precision number is padded with only two bits to the left and only one bit to the right (for a total of 56-bits), it takes only 7-clock cycles for multiplier 113 to process double precision number 502.

With the padding scheme shown in FIG. 8, no clock cycles are gained or lost in comparison with a padding scheme padding eight bits to the left for single precision number 501 and extended precision number 503. For example, if single precision number 501 was padded with eight bits to the left and no bits to the right, it would take four clock cycles to process number 501. But by padding number 501 with 2-bits to the left and with 6-bits to the right, four clock cycles are still necessary to process single precision number 501. In addition, if eight bits were padded to the left for extended precision number 503 and zero bits were padded to the right, it would take nine clock cycles to process extended precision number 503. But with two bits padded to the left and six bits padded to the right, it still takes nine clock cycles to process extended precision number 503, which is 72-bits long.

In an alternative embodiment of the present invention, an alternative padding scheme would be used wherein (1) a single precision multiplier would be padded with eight zero bits to the left and no zeroes or ones to the right, (2) a double precision multiplier would be padded with two zero bits to the left and one zero bit to the right, and (3) an extended precision number would be padded with eight zero bits to the left and no zeroes or ones to the right.

In an alternative embodiment of the present invention, a mantissa multiplier would be padded with a zero in each of L bit positions to the left of the most significant bit position. The multiplier would also be padded with a zero in each of R bit positions to the right of the least significant bit position of the first number. For an N-bit multiplier that is multiplied using four 2-bit Booth algorithm pairs, L=D−N. D is a smallest positive integer that is a multiple of 8 that will yield an integer L of 2 or greater. If D minus N is an odd number, then R is made equal to one and L is given a value equal to D minus N minus one, or, in other words, the next lowest even number. L must be given an even number. But if D minus N is an even number, then R is made equal to zero.

After properly padding the multiplier bit, Booth recoding circuitry then generates control signals that are sent to partial product generators 241, 242, 243, and 244, as shown in FIGS. 9 and 10.

In every phase two of a clock cycle, Booth recoding circuitry 217 scans eight bits of the mantissa multiplier three-bits at a time according to the scanning method described above. Eight-bit positions 601 of the mantissa multiplier are shown in FIG. 9. Bit triplets 611, 612, 613, and 614 are scanned by Booth recoding circuitry 217.

The bit minus one of multiplier bits 601 represents the leftmost bit of the previous eight bits received by Booth recoding circuitry 217.

FIG. 10 illustrates encoding table 701 of the eight possible permutations of the three multiplier bits for the Booth algorithm. Columns 711 and 712 are for the present pair of bits. Column 713 shows the high order bit from the previous 2-bit pair. For bit triplet 611, column 711 would represent the bits in the bit one position of the mantissa multiplier in register SREG 211. For bit triplet 611, column 712 would represent the possible bits in bit position zero (i.e., the LSB) of the mantissa multiplier in register SREG 211. For bit triplet 611, column 713 would represent the possible bits in the leftmost bit position of the previous group of 8-bits processed by Booth recoding circuitry 217 and received from the mantissa multiplier in register SREG 211.

Column 714 represents what partial products are to be formed by partial product generators 241 through 244 in the next phase one of the clock cycle. Column 714 shows which partial products are to formed for each of the combination of bits set forth in rows 721 through 728.

For row 721, the partial product is to be zero times the multiplicand stored in register 219. For rows 722 and 723, the partial products are each to be one times the multiplicand in register 219. For row 724, the partial product is to be two times the multiplicand stored in register 219. For row 725 the partial product is to be minus two times the multiplicand of register 219. For 726 and 727, the partial product is to be minus one times the multiplicand in register 219. For row 728, the partial product is to be minus zero times the multiplicand in register 219.

Column 715 shows on which control line a logical one is to appear for each of the different partial products in column 714. Equivalent partial products have logical ones sent out on the same control lines. For example, the partial products in rows 721 and 728 are logically equivalent, so for either of those partial products a logical one is sent on the same control line.

The control lines referred to column 715 are shown in FIG. 9, together with the control encoding scheme of Booth recoding circuitry 217. Bits of bit triplet 611 are sent to combinational logic 631 via lines 621. The combinational logic 631 acts according to table 701 to send out control signals on lines 641 through 645. Only one of lines 641 through 645 contains a logical one at a given time for bit triplet 611.

For example, if bits 611 are all zeroes, then according to table 701, the partial product should be zero times the multiplicand in register 219. Combinational logic then sends a logical one on line 641. But if the two rightmost bits of triplet 611 are ones and the leftmost bit is a zero, then combinational logic 631 sends out a logical one only on line 643.

Lines 641 through 645 are part of lines 293 of FIG. 4. Lines 641 through 645 are coupled between combinational logic 631 and latch 231. A signal sent on lines 641 through 645 is latched into latch 231 during a phase one of the clock cycle. Bit triplet 611, combinational logic 631, and lines 641 through 645 are thus associated with the first stage carry-save adder 221.

Similarly, combination logic circuits 632, 633, and 634 each implement the Booth encoding scheme of table 701. Bit triplet 612 is coupled to combinational logic 632 via lines 622. Combinational logic 632 sends out a control signal on one of lines 651 through 655 to be latched in latch 232. Bit triplet 612 and combinational logic 632 are thus associated with second stage carry-save adder 222. Lines 651 through 655 are part of lines 293 of FIG. 4.

Bit triplet 613 is coupled to combinational logic 633 via lines 623. Combinational logic 633 sends a control signal out on one of lines 661 through 665 to be latched in latch 233. Lines 661 through 665 are part of lines 293. Bit triplet 613 and combinational logic 633 is thus associated with third stage carry-save adder 223.

Bit triple 614 is sent to combinational logic 634 via lines 624. Combinational logic 634 sends out a control signal on one of lines 671 through 665 to be latched in latch 233. Lines 661 through 665 are part of lines 293. Bit triplet 613 and combinational logic 633 is thus associated with third stage carry-save adder 223.

Bit triple 614 is sent to combinational logic 634 via lines 624. Combinational logic 634 sends out a control signal on one of lines 671 through 675 to be latched in latch 234 in the next phase one of the clock cycle. Lines 671 through 675 are part of lines 293. Bit triplet 614 and combinational logic 634 are thus associated with fourth stage carry-save adder 224.

Latches 231, 232, 233, and 234 each receive data from Booth recoding circuitry 217 via lines 293 that is latched into latches 231 through 234 in phase one of the clock cycle.

In phase one of the clock cycle, the 67-bit multiplicand is latched into latch 219 from register OPA 209 via Abus 146.

Multiplicand register 219 is coupled to partial product generators 241, 242, 243, and 244 via lines 305.

Latches 231, 232, 233, and 234 are each a five-bit latch. Only one of the five bits for each of latches 231 through 234 is a logical high at a time; the other bit positions contain a logical zero. The bit positions correspond to the control lines referred to in column 715 of Booth algorithm table 701 of FIG. 10. Latches 231 through 234 thus store the Booth control signals from combinational logic circuits 631 through 634.

Five lines 301 couple latch 231 to partial product generator 241. Each of the five lines corresponds to one of the Booth control lines referred to in column 715 of table 701. Thus, each of lines 301 correspond to line 641 through 645.

Five lines 302 couple latch 232 to partial product generator 242. Each of the five lines 302 correspond to lines 651 through 655.

Lines 303 couple latch 233 to partial product generator 243. Each of the lines 303 correspond to lines 661 through 665.

Five lines 304 couple latch 234 to partial product generator 244. Each of the lines 304 correspond to lines 671 through 675.

In mantissa multiplier 113, Booth recoding discussed above occurs during phase two of the clock cycle. Then in phase one of the clock cycle, partial products are generated by partial product generators 241 through 244, and added together by carry-save adders 221 through 224. The sum and carry results of the carry-save additions are then latched in phase two of the clock cycle.

Partial products are generated in phase one by partial product generators 241 through 244 according to the Booth algorithm encoding table 701. Table 701 shows that there are five different types of partial products, a different control signal being sent for each of the different partial products. If control signal C_A is sent to each of the partial products generators 241 through 244 from Booth recoding circuitry 217 via latches 231 through 234, then partial product generators 241 through 244 send out the following signals. Control singal C_A means that the partial product is to be zero times the multiplicand in register 219. A zero times any number is zero, so partial product generator 241 sends a 69-bit wide number comprised of all zeroes to carry-save adder 221 via lines 311. Partial product generator 242 sends out a 71-bit wide number comprised of all zeroes to carry-save adder 222 via lines 312. Partial product generator 243 sends out a 73-bit wide number comprised of all zeroes to carry-save adder 223 via lines 313. Partial product generator 244 sends out a 75-bit wide number comprised of all zeroes to carry-save adder 224 via lines 314.

Sixty-nine-bit carry-save adder 221 is 2-bits wider than the 67-bit multiplicand stored in register 219 for two reasons. One bit of the two bits of extra width is needed as an extra bit for a left shift in order to create a partial product of minus one times the multiplicand and a partial product of minus two times the multiplicand. The other bit of the extra two bit width is due to the necessity for a sign extension bit given that binary numbers in two's-complement form are used. For example, if the base ten number negative ten were converted to two's-complement form, the binary result would have to be expressed by the five bits 10110 to show that the two's complement number represented a negative number. The extra left bit is thus necessary for sign extension purposes.

Seventy-one bit carry-save adder 222 is 2-bits wider than 69-bit carry-save adder 221 because the partial product is shifted left by two bits given that the multiplication is being carried out for two bits at a time. Similarly, seventy-three bit wide carry-save adder 223 is 2-bits wider than 71-bit carry-save adder 222 because the partial product is shifted left by two bits given that the multiplication is being carried out for two bits at a time. Moreover, seventy-five bit wide carry-save adder 224 is 2-bits wider than carry-save adder 223 because the partial product is shifted left by two bits given that the multiplication is being carried out for two bits at a time.

If control signal C_B is sent from Booth recoding circuitry 217 to partial product generators 241 through 244, then the following signals are sent by those partial product generators to carry-save adders 221 through 223. Control signal C_B indicates a partial product of one times the multiplicand in register 219. Partial product generator 241 adds two zeros to the left of the 67 bits of the multiplicand of register 219 and sends the 69 bits to carry-save adder 221 via lines 311. Partial product generator 242 adds two zeroes to the left of the multiplicand of register 219 and also adds two zeroes to the right of the multiplicand of register 219, for a total of 71-bits. The 71-bits are sent from partial product generator 242 to carry-save adder 222 via lines 312. Partial product generator 243 adds two zero bits to the left of multiplicand of register 219 and also adds four zero bits on the right of the multiplicand of register 219, for a total of 73 bits. Those 73 bits are transferred from partial product generator 243 to carry-save adder 223 via lines 313. Partial product generator 244 add two zero bits to the left of the multiplicand of register 219 and also adds six zero bits on the right of the multiplicand of register 219, for a total of 75 bits. Those 75 bits are then transferred from partial product generator 244 to carry-save adder 224.

Extra bits are added as described above to the left of the multiplicand in register 219 by partial product generator 241 and to the left and right of the multiplicand in register 219 by partial product generators 242 through 244 for the same reasons stated above with regard to the sizes of the carry-save adders 221 through 224. The multiplicands are thus widened by partial product generators 241 through 244 because the partial product is shifted left by two bits given that the multiplication is being carried out for two bits at a time.

Zeroes, rather than one bits, are added to the left and right sides of the multiplicand because the partial product required by rows 722 and 723 of table 702 require multiplication of the multiplicand by a positive number.

If the control signal C_C is sent from Booth recoding circuitry 217 to partial product generators 241 through 244, then the following signals are generated by the partial product generators 241 through 244. Control signal C_C from table 701 indicates a partial product of two times the multiplicand stored in register 219. Multiplication of a binary number by two simply requires that the binary number be shifted to the left by one bit. Therefore, partial product generator 241 takes the multiplicand from register 219 and adds one zero to the right and one zero to the left resulting in 69 bits. The 69 bits are transferred from partial product generator 241 to carry-save adder 221 via lines 311. Partial product generator 242 takes the multiplicand of register 219 and adds three zeroes on the right and one zero on the left, resulting in 71 bits. The 71 bits are transferred from partial product generator 242 to carry save adder 222 via lines 312. Partial product generator 243 takes the multiplicand of register 219 and adds five zero on the right and one zero on the left, resulting in 73 bits. The 73 bits are transferred from partial product generator 243 to carry-save adder 223 via lines 73. Partial product generator 244 takes the multiplicand of register 219 and adds seven zeroes on the right and one zero on the left resulting in 75-bits. The 75-bit number is then transferred from partial product generator 244 to carry-save adder 224.

Control signals C_D and C_E each require the generation of a partial product that is a negative number. The partial product for control signal C_D is negative two times the multiplicand in register 219. The partial product for control signal C_E is negative one times the multiplicand in register 219.

Multiplier circuitry 113 uses two's-complement numbers in order for both positive and negative numbers to be represented. If a number is positive, the two's-complement of that number is merely the number itself. If a number is negative, however, multiplier 113 requires that the one's-complement be taken of the number, and then a logical 1 bit be added to the least significant bit of the one's-complement number. A one's-complement of a number is made by merely inverting each bit of the number. In other words, a zero would be changed to a one, and a one would be changed to a zero.

To form negative partial products, partial product generator 241 takes the one's-complement of the corresponding positive partial product, and places the result in the carry-save adder that is in the same stage as the partial product generator. The logical one, however, that must be added to the one's-complement number is added at the next higher stage of carry-save adder or carry latch, rather than at the same stage of the carry-save adder. This approach reduces the number of carry-save adders required by multiplier 113 by one carry-save half adder, as described below. Therefore, if control signals C_D or C_E are sent to the each of the partial product generators 241 through 244, then each of the carry-ins on lines 345, 347, 349, and 351 will be a logic one. This contrasts with the situation of control signal C_A, C_B, and C_C being sent to each of the partial product generators 241 through 244. In the latter case, carry-ins 345, 347, 349, and 351 would all be a logic zero.

The signals generated by partial product generators 241 through 244 for control signal C_D are as follows. Partial product generator 241 takes the multiplicand of register 219 and inverts each of its bits (thus forming its one's complement), and adds a one bit to the right and a one bit to the left. The resulting 69 bit number is transferred from partial product generator 241 to carry-save adder 221 via lines 311. In order to form the negative two's-complement number, a logical one is sent on carry-in line 345 to carry-save adder 222.

Partial product generator 242 takes the multiplicand of register 219 and inverts each bit, and also adds three one bits on the right and a one bit on the left. The resulting 71 bit number is transferred to carry-save adder 222 from partial product generator 242 via lines 312. To form the negative two's-complement number, partial product generator 242 also sends a carry-in one bit on line 347 to carry-save adder 223.

Partial product generator 243 inverts each bit of the multiplicand of register 219 and adds five ones on the right and a one bit on the left. The resulting 73-bit number is transferred from partial product generator 243 to carry-save adder 223 via lines 313. Partial product generator 243 also sends a carry-in one bit to carry-save adder 224 via line 349. This is to be sure that a negative partial product is formed.

Partial product generator 244 forms the one's-complement of the multiplicand of register 219, and adds seven one bits on the right and a one bit on the left. The resulting 71 bit number is transferred to carry-save adder 224 from partial product generator 244 via lines 314. Partial product generator 244 also sends a carry-in one bit on line 351 to carry latch 253.

Carry-in lines 345, 347, and 349 are each connected to the least significant bits of their respective carry-save adders 22, 223, and 224. Carry-in line 351 is connected to the least significant bit of carry latch 253.

The signals generated by partial product generators 241 through 244 for control signal C_E from Booth recoding circuitry 217 are as follows. Partial product generator takes the multiplicand of register 219 and inverts each bit, and two one bits are added to the left of the multiplicand. The resulting 69 bit number is transferred to carry-save adder 221 from partial product generator 241 via lines 311. In order to form a negative two's complement number, partial product generator 241 sends a logical one carry-in to carry-save adder 222 on line 345.

Partial product generator 242 takes the multiplicand of register 219 and inverts each bit, and adds two one bits on the right side and two one bits on the left side. The resulting 71 bit number is transferred from partial product generator 242 to carry-save adder 222. In order to form a negative two's complement number, a logical one bit is transferred from the partial product generator 242 to carry-save adder 223 via carry-in line 347.

Partial product generator 243 takes the multiplicand of register 219 and forms the one's-complement of each bit (i.e., by inverting each bit), and two one bits on the left and four one bits on the right. The resulting 73 bit number is then transferred to carry-save adder 223 via lines 73 from partial product generator 243. In order to form a negative two's-complement number, partial product generator 243 sends a logic one signal to carry-save adder 224 via carry-in line 349.

Partial product generator 244 inverts each bit of the multiplicand of register 219, and adds two one bits on the left and six one bits on the right. The resulting 75 bit number is then transferred to carry-save adder 224 from partial product generator 244 via lines 314. In order to form a negative two's-complement number, partial product generator also sends a logic one to carry latch 253 on carry-in line 351.

Although the above description refers to one type of control signal (e.g., C_C) being sent to all the partial product generators 241 through 244 at once, it is to be appreciated that each partial product generator of generators 241 through 244 could for a given phase one of a clock cycle be sent different combinations of control signals. For example, partial product generator 241 could receive a C_A control signal, while generator 242 gets a C_D control signal, generator 243 gets a C_E control signal, and generator 244 gets a C_B control signal.

The carry-save adders (with sign extenders) 221 through 224 add their various sum and carry inputs to generate sum and carry outputs. Thus, carry-save adders 221 through 224 serve to add the partial products generated by partial product generators 241 through 244.

Carry-save adder 221 sends its sum to carry-save adder 222 via lines 322 and its carry via lines 332. Carry-save adder 222 sends its sum to carry-save adder 223 via lines 323 and its carry via lines 333. Carry-save adder 223 sends it sum to carry-save adder 224 via lines 324 and its carry via lines 334. Lines 322 are 71 bits wide, lines 323 are 73 bits wide, and lines 324 are 75 bits wide. Lines 332 are 70 bits wide, lines 333 are 72 bits wide, and line 334 are 74 bits wide.

In phase two of the clock cycle, the sum output of carry-save adder 224 is latched into sum latch 251 via 75 bit wide lines 341. The carry output of carry-save adder 224 is latched into carry latch 253 in phase two of the clock cycle via 74-bit wide lines 343. The carry-in input on lines 351 to carry-latch 253 is also latched into carry latch 253 in phase two of the clock cycle.

Sum latch 251 is coupled to carry propagate adder 262 via lines 357 and 363. Sum latch 251 is coupled to Abus driver 266 via lines 257. Sum latch 251 is also coupled to sum truncation and register unit 255 via lines 357.

Carry latch 253 is coupled to carry propagate adder 262 via lines 359 and 361. Carry latch 253 is also coupled to B bus 268 via lines 359. Carry latch 253 is also coupled to carry truncation and register unit 257 via lines 359.

Multiplier 113 performs a loop addition through carry-save adders 221 through 224. The loop addition is performed $(N/8)+1$ times, wherein N is the size of the mantissa multiplier. This loop is performed once per clock cycle.

After each performance of the loop, register SREG 211 is shifted another 8-bits to the right during phase two of the clock cycle. During the subsequent phase one of the clock cycle, the new Booth control bits are latched into latches 231 through 234. New partial products are generated, and the carry-save adders 221 through 224 add the partial products. The sum is placed in sum latch 251 and the carry is placed in carry latch 253 in the subsequent phase two of the clock cycle. In this way, sums and carries are built up in the sum latch 251 and the carry latch 253.

For each cycle of the loop, carry propagate adder 262 adds the least significant 8-bits of the sum bits stored in sum latch 251 to the least significant eight carry bits stored in carry latch 253. The least significant eight sum bits are retrieved from lines 357 via lines 363. The least significant eight carry bits are retrieved from lines 259 via lines 361. Lines 363 are eight bits wide, and are connected to the least significant bit lines of lines 357. Lines 357 are 75 bits wide. Bit lines 361 are eight bits wide and are connected to the least significant eight bits of lines 359. Lines 359 are 75 bits wide.

Carry propagate adder 262 adds the eight least significant sum bits to the eight least significant carry bits, and places the result in sticky bit logic 260 via lines 371. In addition, the most significant bit of the carry generated by the carry propagate addition of the 8 sum bits and the 8 carry bits is stored in latch 264 via line 367.

On the next multiplication loop, the output of carry latch 264 is then applied as a carry-in input to carry propagate adder 262. Thus, carry propagate adder 262 adds the eights bits on lines 263, the eight bits on lines 361, and the one carry bit that is on line 369.

Carry propagate adder 262 together with latch 264 is thus used to retain the carry for each loop of mantissa multiplier 113.

The least significant bit on lines 359 is the carry-in bit supplied to carry latch 253 on line 351. It follows that the least significant bit on line 361 which runs into carry propagate adder 262 is also the carry-in input 351 to carry latch 253. Therefore, the carry-in 351 to carry latch 253 is included in each addition by carry propagate adder 262.

One of the reasons carry latch 253 can be used to store carry-in 351 following latch carry latch 224 is that the carry input into carry latch 253 via lines 343 is shifted left by one bit because it is a carry. Therefore, there is an opening in the right most bit of latch 253 for a carry-in input.

Another reason carry latch 253 can be used following carry-save adder 224 is that carry propagate adder 262 serves to add the carry-in from line 351 to the least significant sum bit. Carry propagate adder 262 stores the most significant carry bit from the addition of the least significant eight sum bits and the least significant eight carry bits.

During the next phase one of the clock cycle, sum truncation unit 255 truncates the least significant eight bits from the 75-bits on line 357. Sum truncation unit 255 truncates by shifting the sum to the right by 8 bits, and then storing the 67-bit result in a register in unit 255.

Sum truncation and register unit 255 also includes sign extension circuitry that adds either ones or zeroes to the left of the truncated sum to get the proper sign. The resulting 69-bit sum is then applied as a sum input to carry-save adder 221 via lines 321.

Carry truncation and register unit 257 truncates the eight lowest order 8-bits from lines 359 and stores the result in a register in carry truncation unit 257. Carry truncation unit 257 truncates by shifting the carry to the right by 8 bits, and then storing the 67-bit result in a register in unit 257. Carry truncation unit and register 257 also includes sign extension circuitry that adds either ones or zeroes to the left of the truncated carry to get the proper sign. The 69-bit carry is then applied as a carry input to carry-save adder 221 via lines 331.

Given that sum lines 321 and carry lines 331 loop back to carry save adder 221 from sum truncation unit 255 and carry truncation unit 257, it can be seen that a loop is formed. For each repetition of the loop, truncated sums and carrys are sent back to carry-save adder 221.

Moreover, for each repetition of the loop, sums and carrys build up in sum latch 251 and carry latch 253, and on sum lines 357 and carry lines 359.

The repetition of the loops end when all the padded mantissa bits have been used up by Booth recoding circuitry 217. At that point, the 67 sum bits on lines 357 are sent to a first input of mantissa adder 107 (see FIG. 3) via Abus driver 266 and Abus 146. In addition, at that point the 67 bits on carry lines 359 are sent to a second input of mantissa adder 107 via B bus driver 268 and B bus 252. At that point, however, the carry-out of carry propagate adder 262 is sent to a carry-in input of mantissa adder 107 via line 365. The carry-out output of carry propagate adder 262 is the most significant carry bit that results from the addition of the eight most significant sum bits on lines 357 to the eight most significant carry bits on lines 359. This final eight bit addition occurs for the last eight bits of the padded mantissa multiplier.

Mantissa adder 107 is a 68-bit adder, that yields a 68-bit wide final sum on lines 148. The extra one bit of mantissa adder 107 allows it to include any final carry-out in its final sum. The final sum is sent via lines 148 to accumulator 145. The final sum is then latched into mantissa latch 104 via Abus 146. The result of any exponent addition is latched into exponent latch 102.

Mantissa adder 107 is a full adder that has three inputs (i.e., a first input, a second input, and a carry-in input) and a single output.

FIG. 11 illustrates the circuitry of partial product generator 241 coupled to a single bit of the multiplicand stored in register 219. Control line 771 corresponds to control line C1E of combinational logic 631. Control line 772 corresponds to control line C1B of combinational logic 631. Control line 773 corresponds to control line C_D of combinational logic 631. Control line 774 corresponds to control line C1C of combinational logic 631. Control line 775 corresponds to control line C1A of combinational logic 631.

CMOS transistors 757, 759, 761, 763, and 765 comprise a five-to-one multiplexer. Line 752 is coupled via inverter 799 to a bit N of the multiplicand stored in register 219, wherein N is one of the 67-bits of the multiplicand. Line 790 is coupled to bit N−1 of the multiplicand.

Figure 12:
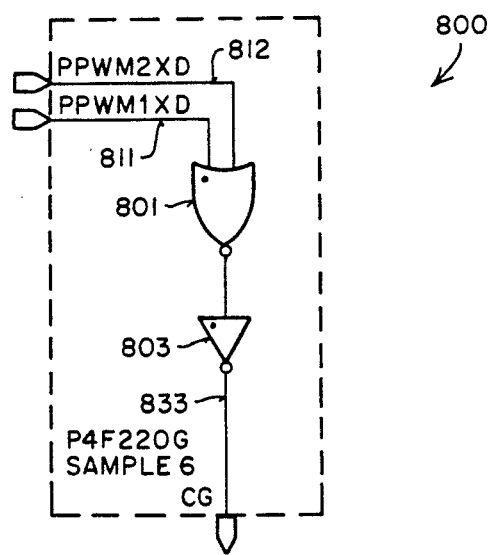
FIG. 12 illustrates circuitry for the carry-in bit of a partial product generator of the multiplier.

FIG. 12 shows carry-in circuitry 800 which is the carry-in circuitry for partial product generator 241 of multiplier 113. Control line 812 corresponds to control line C1D of combinational logic 631. Control line 811 corresponds to control line C1E of combinational logic 631. Line 833 is the carry-in output line coupled to carry-in line 345 of next-stage carry-save adder 222.

FIG. 13 illustrates carry-save add circuitry 850 for one-bit of carry save adder 222, and is comprised of CMOS transistors 871 through 896. Carry input line 869 corresponds to carry input line 332. Sum input 867 corresponds to sum input line 322. Line 865 corresponds to the partial product line 312. Carry output line 851 corresponds to carry output line 333. Sum output line 852 corresponds to sum output line 323.

FIG. 14 illustrates a timing diagram for mantissa multiplier 113. Waveform 902 represents phase two of the clock cycle, and waveform 901 represents phase one of the clock cycle. At approximately point 912 on the phase two wave form, the mantissa multiplier is written into register SREG 211 from Abus 146. Booth recoding occurs approximately between points 912 and 913. In phase one waveform 901, at approximately point 914, latches 231 and 234 and latched. Approximately between points 914 and 916 data is acted upon by partial product generators 241 through 244 and carry-save adders 221 through 224.

Data is latched into sum latch 251 and carry latch 253 at approximately point 918. At approximately point 914 in the phase one waveform, (1) sum and carry units 255 and 257 shift right by eight bits and then perform a sign extend and (2) the carry bit from carry-propagate adder 262 is latched into latch 264.

Returning to FIG. 4, the partitioning of logic of multiplier 113 is such that propagation through the four carry-stage adder stages does not remain a critical timing path.

In the foregoing specification, the invention has been described with specific exemplary embodiments thereof. If will, however, evident that various modifications and changes may be made thereto without departing from the broader spirit and scope of the invention as set forth in the appended claims. The specifications and drawings are, accordingly to be regarded in an illustrative rather than a restrictive sense.

What is claimed is:

1. A method for optimizing a speed of a subsequent multiplication in a digital system of a first number by a second number, wherein the second number has bit positions including (1) a bit position of order X, which is a least significant bit position of the second number, (2) a bit position of order Y, and (3) a bit position of order Z, wherein X is less than Y, and Y is less than Z, comprising the steps of:
   (a) detecting whether a string of consecutive zeroes occupies the bit positions of the second number beginning with the bit position X and increasing towards higher order bit positions;
   (b) if no such string of consecutive zeroes exists, then using bit position X as a starting point for the second number for multiplication;
   (c) if both (i) the string of consecutive zeroes exists and (ii) the string of consecutive zeroes has its highest order zero in a bit position having an order less than Y minus one, then using bit position X as a starting point for the second number for multiplication;
   (d) if both (i) the string of consecutive zeroes exists and (ii) the string of consecutive zeroes has its highest order zero in a bit position having an order less than Z minus one but greater than or equal to Y minus one, then using bit position Y as a starting point for the second number for multiplication;
   (e) if both (i) the string of consecutive zeroes exists (ii) the string of consecutive zeroes has its highest order zero in a bit position having an order greater than or equal to Z minus one, then using bit position Z as a starting point for the second number for multiplication.

2. The method of claim 1 for optimizing the speed of a subsequent multiplication, wherein X is zero, Y is 11, and Z is 40.

3. The method of claim 1 for optimizing the speed of a subsequent multiplication, wherein the subsequent multiplication uses four 2-bit Booth algorithm pairs of bits of the first number per clock cycle.

4. Circuitry for optimizing a speed of a subsequent multiplication in a digital system of a first number by a second number, wherein the second number has bit positions including (1) a bit position of order X, which is a least significant bit position of the second number, (2) a bit position of order Y, and (3) a bit position of order Z, wherein X is less than Y, and Y is less than Z, comprising:
   (a) zero detect logic for detecting whether a string of a consecutive zeroes occupies the bit positions of the second number beginning with the bit position X and increasing towards higher bit positions;
   (b) logic circuitry for:
      (1) using bit position X as a starting point for multiplication of the second number (i) if no such string of consecutive zeroes exists of (ii) if both (A) the string of consecutive zeroes exists and (B) the string of consecutive zeroes has its highest order zero in a bit position having an order less than Y minus one;
      (2) using bit position Y as a starting point for multiplication of the first number if both (i) the string of consecutive zeroes exists and (ii) the string of consecutive zeroes has its highest order zero in a bit position having an order less than Z minus one but greater than or equal to Y minus one;
      (3) using bit position Z as a starting point for multiplication of the first number if both (i) the string of consecutive zeroes exists and (ii) the string of consecutive zeroes has its highest order zero in a bit position having an order greater than or equal to Z minus one.

5. A method for optimizing multiplication clock cycles in a digital system, comprising the steps of:
   (a) prior to multiplying a first number by a second number comprised of N bits using B 2-bit Booth algorithm pairs of bits of the second number per clock cycle, wherein B is a positive integer and N is a positive integer, padding the second number with a zero in each of two bit positions to the left of the most significant bit position of the second number; and
   (b) prior to multiplying the first number by the second number using B 2-bit Booth algorithm pairs of bits of the second number per clock cycle, padding the second number with a zero in each of C bit positions to the right of the least significant bit position of the second number, wherein C equals D−(N+2), wherein D is a smallest positive integer that is a multiple of B times 2 that will also yield a C that is either zero or a positive integer.

6. The method of claim 5 for optimizing multiplication clock cycles, wherein N is 53, B is 4, C is one, and D is 56.

7. Circuitry for optimizing multiplication clock cycles in a digital system, comprising circuitry for padding a second number comprised of N bits prior to multiplying a first number by the second number, wherein the multiplication uses B 2-bit Booth algorithm pairs of bits of the second number per clock cycle, wherein B is a positive integer and N is a positive integer, wherein the padding comprises:

(a) padding the second number with a zero in each of two bit positions to the left of the most significant bit position of the second number; and (b) padding the second number with a zero in each of C bit positions to the right of the least significant bit position of the second number, wherein C equals $D-(N+20)$, wherein D is a smallest positive integer that is a multiple of B times two that will also yield a C that is either zero or a positive integer.

8. The circuitry of claim 7 for optimizing multiplication clock cycles, wherein N is 53, B is 4, C is one, and D is 56.

9. A method for multiplication in a digital system, comprising the steps of:

(a) having a partial product generator generate a first multibit output and a first carry-in output;

(b) having a carry-save adder add:
  (1) the first multibit output from the partial product generator,
  (2) a sum applied as a sum input into the carry-save adder, and
  (3) a carry applied as a carry input into the carry-save adder;

(c) latching a sum output of the carry-save adder into a sum latch;

(d) latching a carry output of the carry-save adder into a sequence of bit positions of the carry latch, wherein the first position of the sequence of bit positions is of a next highest order from a least significant bit position;

(e) latching the first carry-in output of the partial product generator into the least significant bit position of the carry latch;

(f) adding
  (1) the least significant T bits of the sum from the sum latch,
  (2) The least significant T bits of the carry from the carry latch, and
  (3) a final stage carry-in bit, wherein T is a positive integer;

(g) storing the most significant carry bit from the addition of the least significant T sum bits from the sum latch and the least significant T carry bits from the carry latch;

(h) truncating the least significant T sum bits from the sum latch and storing the result;

(i) truncating the least significant T carry bits from the carry latch and storing the result;

(j) repeating steps (a) through (i), the first multibit output of the partial product generator becoming a second multibit output of the partial product generator, the first carry-in output of the partial product generator becoming a second carry-in output of the partial product generator, the truncated sum becoming a sum applied as a sum input to the carry-save adder, the truncated carry becoming a carry applied as a carry input to the carry-save adder, and the stored most significant carry bit from the addition of the least significant T sum bits and T carry bits becoming the final stage carry-in bit.

10. The method of claim 9 for multiplication, wherein the generation of the multibit output and the carry-in output of the partial product generator is governed by a two-bit Booth algorithm.

11. The method of claim 10 for multiplication, wherein a multiplicand is multiplied by a multiplier, the Booth algorithm being applied to the multiplier, and wherein steps (a) through (i) are repeated $N/2+1$ times, wherein N represents the number of bits comprising the multiplier.

12. The method of claim 11 for multiplication, wherein T is two.

13. Circuitry for multiplication in a digital system, comprising:

(a) a partial product generator that generates a multibit output and a carry-in output;

(b) a carry-save adder that adds:
  (1) the multibit output from the partial product generator;
  (2) a sum applied as a sum input into the carry-save adder; and
  (3) a carry applied as a carry input into the carry-save adder;

(c) a sum latch for latching a sum output of the carry-save adder;

(d) a carry latch having bit positions, wherein (i) a carry output of the carry-save adder is latched into a sequence of bit positions in the carry latch, wherein the first position of the sequence of bit positions is a next highest order from a least significant bit position, and (ii) the carry-in output of the partial product generator is latched into the least significant bit position of the carry latch;

(e) an adder for adding
  (1) the least significant T bits of the sum from the sum latch,
  (2) the least significant T bits of the carry from the carry latch, and
  (3) a final stage carry-in bit, wherein T is a positive integer;

(f) a latch for storing the most significant carry bit from the addition of the least significant sum bits from the sum latch and the least significant T carry bits from the carry latch;

(g) circuitry for truncating the least significant T sum bits from the sum latch and for storing the result;

(h) circuitry for truncating the least significant T carry bits from the carry latch and for storing the result;

(i) coupling means for applying the truncated sum as a sum input to the carry-save adder;

(j) coupling means for applying the truncated carry as a carry input to the carry-save adder;

(k) coupling means for applying the most significant carry bit from the addition of the least significant T sum bits and T carry bits as the final stage carry-in bit.

14. The circuitry of claim 13 for multiplication in a digital system, wherein the generation of the multibit output and the carry-in output of the partial product generator is governed by a Booth algorithm.

* * * * *

UNITED STATES PATENT AND TRADEMARK OFFICE
CERTIFICATE OF CORRECTION

PATENT NO. : 5,036,482
DATED : July 30, 1991
INVENTOR(S) : Avtar Saini

It is certified that error appears in the above-indentified patent and that said Letters Patent is hereby corrected as shown below:

| COLUMN | LINE | |
|---|---|---|
| 2 | 19 | change "is" to --are-- |
| 3 | 35 | insert --,-- after "generator" |
| 3 | 46 | change "lease" to --least-- |
| 4 | 29 | change "one-bit" to --one bit- |
| 4 | 59 | insert --data-- after "moving" |
| 5 | 13 | delete "2" and substitute --3-- |
| 6 | 11 | change "65-bits" to --65 bits-- |
| 6 | 25 | change "bits plus" to --bit plus- |
| 6 | 55 | insert --number-- after "Binary" |
| 6 | 57 | delete --will-- after "hereinafter" |
| 6 | 58 | insert --number-- after "binary" and insert --is-- after "401" |
| 6 | 66 | change "exist" to --exists- |
| 7 | 14 | change "to two" to --to-one-- |
| 7 | 16 | delete "are" and substitute --is- |
| 7 | 34 | change "to two" to --to-one-- |

UNITED STATES PATENT AND TRADEMARK OFFICE
CERTIFICATE OF CORRECTION

PATENT NO. : 5,036,482
DATED : July 30, 1991
INVENTOR(S) : Avtar Saini

It is certified that error appears in the above-indentified patent and that said Letters Patent is hereby corrected as shown below:

| COLUMN | LINE | |
|---|---|---|
| 7 | 51 | change "to two" to --to-one |
| 7 | 54 | insert --430-- after "logic" |
| 8 | 24 | change "211" to --214-- |
| 8 | 31 | insert --214-- after "circuitry" |
| 8 | 32 | change "to-two" to --to-one- |
| 9 | 2 | delete "to two" and substitute --to-one-- |
| 9 | 27 | insert --the-- after "If" |
| 9 | 40 | insert --point-- after "starting" |
| 10 | 19 | change "zero-bits" to --zero bits- |
| 11 | 36 | change "two-bits" to --two bits-- |
| 11 | 39 | change "32-bits" to --32 bits-- |
| 11 | 42 | change "32-bits" to 32 bits-- |
| 11 | 54 | change "8-bits" to --8 bits-- |
| 11 | 67 | change "72-bits" to --72 bits-- |
| 12 | 11 | change "64-bits" to --64 bits-- |

UNITED STATES PATENT AND TRADEMARK OFFICE
CERTIFICATE OF CORRECTION

PATENT NO. : 5,036,482
DATED : July 30, 1991
INVENTOR(S) : Avtar Saini

It is certified that error appears in the above-indentified patent and that said Letters Patent is hereby corrected as shown below:

| COLUMN | LINE | |
|---|---|---|
| 12 | 15 | change "56-bits" to --56 bits-- and change "7-clock" to --7 clock-- |
| 12 | 25 | change "2-bits" to --2 bits-- |
| 12 | 26 | change "6-bits" to --6 bits-- |
| 12 | 34 | change "72-bits" to --72 bits-- |
| 12 | 65 | change "three-bits" to --three bits-- |
| 12 | 66 | change "Eight-bit" to --Eight bit-- |
| 13 | 15 | change "8-bits" to --8 bits-- |
| 13 | 30 | insert --rows-- after "For" |
| 14 | 44 | delete "each of" and change "line" to --lines-- |
| 14 | 47 | delete "Each of the" and substitute --The-- |
| 14 | 50 | delete "Each of the " and substitute --The-- |
| 14 | 53 | delete "Each of the" and substitute --The-- |
| 16 | 35 | change "zero" to --zeroes-- |
| 18 | 39 | change "it" to --its-- |
| 18 | 53 | change "257" to --357-- |

UNITED STATES PATENT AND TRADEMARK OFFICE
CERTIFICATE OF CORRECTION

PATENT NO. : 5,036,482
DATED : July 30, 1991
INVENTOR(S) : Avtar Saini

It is certified that error appears in the above-indentified patent and that said Letters Patent is hereby corrected as shown below:

| COLUMN | LINE | |
|--------|------|---|
| 19 | 45 | change "right most" to --rightmost-- |
| 20 | 10 | change "carrys" to --carries-- |
| 20 | 13 | change "carrys" to --carries-- |
| 20 | 47 | delete "C_D" and substitute --C1D-- |
| 21 | 8 | delete "wave form" and substitute --waveform-- |
| 21 | 12 | delete the second "and" and substitute --are-- |
| 21 | 28 | insert --be-- after "however," |
| 21 | 32 | insert --,-- after "accordingly" |
| 23 | 39 | change "The" to --the-- |

Signed and Sealed this

Seventeenth Day of May, 1994

*Attest:*

BRUCE LEHMAN

*Attesting Officer*  Commissioner of Patents and Trademarks